(12) United States Patent
Kanetake et al.

(10) Patent No.: US 6,259,447 B1
(45) Date of Patent: Jul. 10, 2001

(54) CONTROLLING AN INFORMATION PROCESSING APPARATUS

(75) Inventors: Mitsugu Kanetake; Akira Ohkada; Akira Okada, all of Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/129,334

(22) Filed: Aug. 5, 1998

(30) Foreign Application Priority Data

Jan. 8, 1998 (JP) .................................................. 10-002041

(51) Int. Cl.[7] .................................................... G06F 13/00
(52) U.S. Cl. ............................................. 345/339; 711/100
(58) Field of Search ..................................... 345/339, 332, 345/331, 334, 357; 711/100, 154, 117, 170

(56) References Cited

U.S. PATENT DOCUMENTS

| | | | |
|---|---|---|---|
| 4,791,556 | * 12/1988 | Vilkaitis | 345/348 |
| 4,949,300 | * 8/1990 | Christenson et al. | 707/500 |
| 5,148,544 | * 9/1992 | Cutler et al. | 710/261 |
| 5,335,320 | * 8/1994 | Iwata et al. | 717/4 |
| 5,528,516 | * 6/1996 | Yemini et al. | 702/181 |
| 5,561,763 | * 10/1996 | Eto et al. | 714/35 |
| 5,590,360 | * 12/1996 | Edwards | 707/102 |
| 5,659,788 | * 8/1997 | Someya et al. | 395/500.48 |
| 5,691,917 | * 11/1997 | Harrison | 717/6 |
| 5,724,564 | * 3/1998 | Conder et al. | 712/234 |
| 5,819,279 | * 10/1998 | Togawa | 707/103 |
| 5,832,510 | * 11/1998 | Ito et al. | 707/201 |
| 5,899,991 | * 5/1999 | Karch | 705/5 |
| 5,938,762 | * 8/1999 | Hayakawa et al. | 712/244 |

* cited by examiner

Primary Examiner—Raymond J. Bayerl
Assistant Examiner—Tadesse Hailu
(74) Attorney, Agent, or Firm—Robert P. Tassinard, Jr.

(57) ABSTRACT

For each screen appearing in an application to be automatically executed, information for spacifying the screen (e.g., a screen number or a characteristic message) is recorded, to be compared with another at the time of re-execution to confirm that the automatic execution is being carried out in accordance with a predetermined procedure. An action procedure (e.g., PA2 KEY) for each screen is recorded in preparation for appearance of an exceptional screen. Software is provided for recording an operational procedure of a keyboard or screen position's designation of an input/output variable and, thus, an operator is capable of recording screen specifying data, input variable data and output variable data while an application is being executed.

8 Claims, 13 Drawing Sheets

Normal Processing Screen / Procedure Data
210

Exception Processing Screen / Procedure Data
250

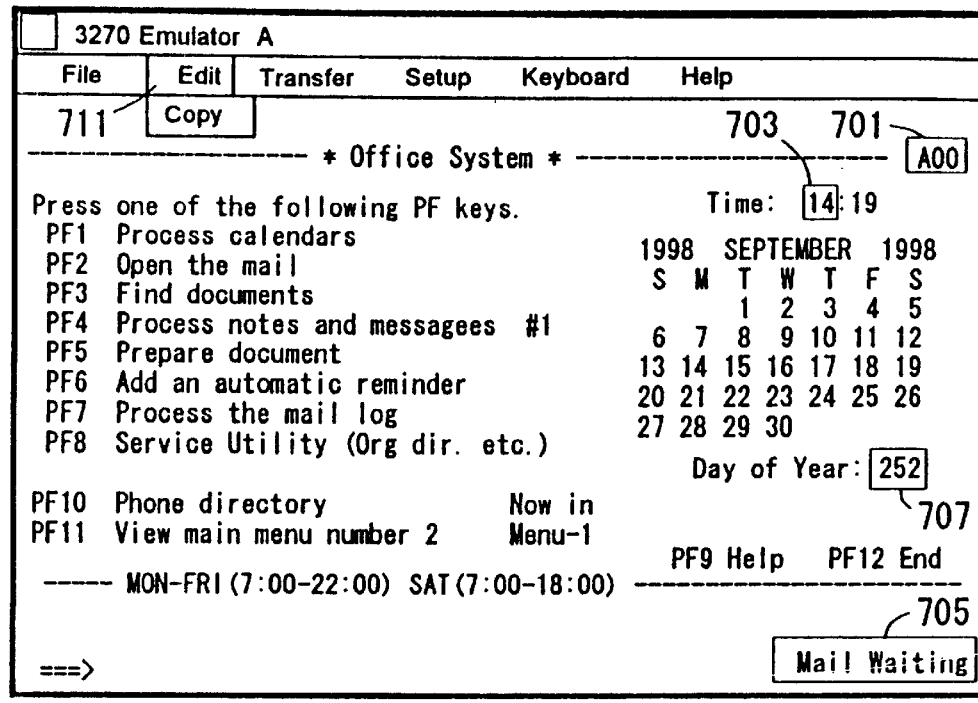
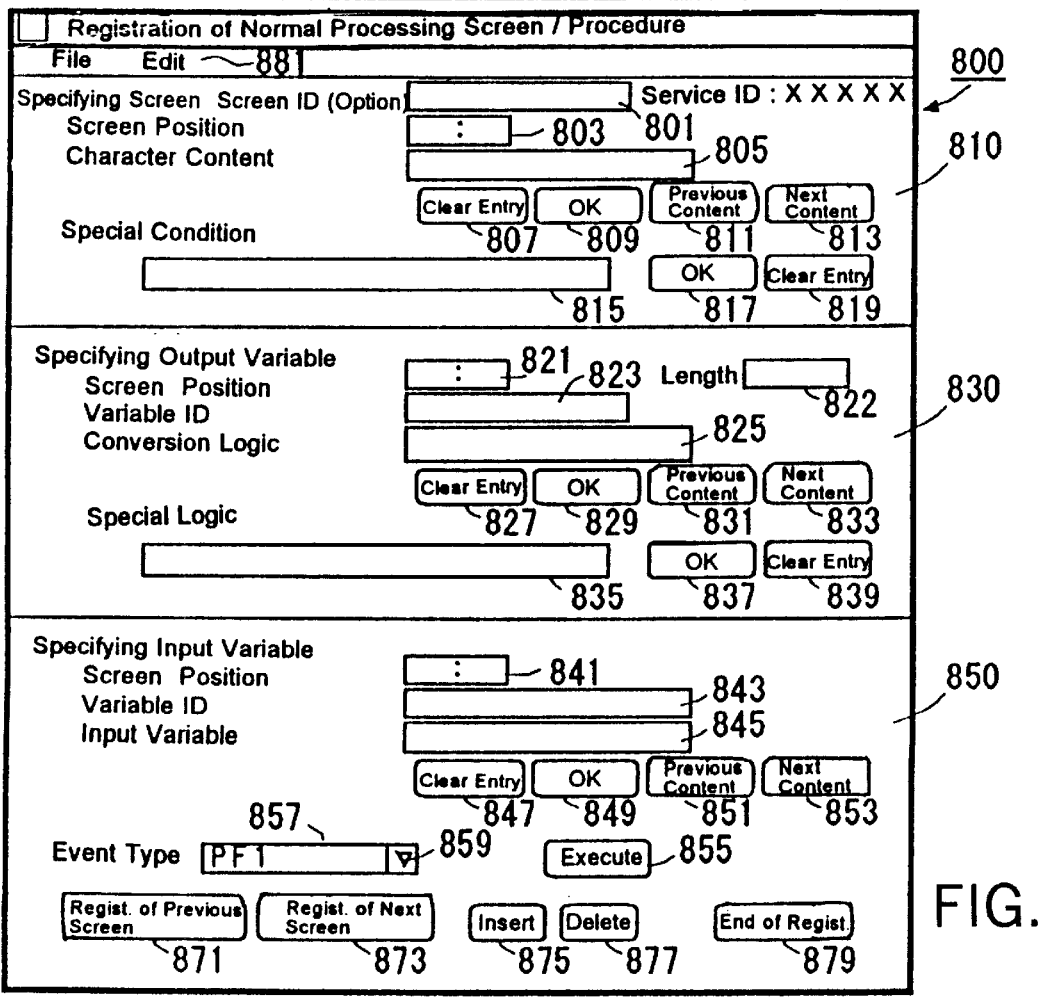
FIG. 7

FIG. 8

```
┌─────────────────────────────────────────────────────┐
│ ☐  3270 Emulator  A                                 │
│  File    Edit   Transfer   Setup   Keyboard   Help  │
│  711  ┌──────┐                        703  701      │
│       │ Copy │                            ┌───┐     │
│  ─────┴──────┴── * Office System * ───────│A00│     │
│                                           └───┘     │
│  Press one of the following PF keys.  Time: [14]:19 │
│   PF1  Process calendars                            │
│   PF2  Open the mail              1998 SEPTEMBER 1998│
│   PF3  Find documents              S  M  T  W  T  F  S│
│   PF4  Process notes and messagees  #1      1  2  3  4  5│
│   PF5  Prepare document            6  7  8  9 10 11 12│
│   PF6  Add an automatic reminder  13 14 15 16 17 18 19│
│   PF7  Process the mail log       20 21 22 23 24 25 26│
│   PF8  Service Utility (Org dir. etc.) 27 28 29 30  │
│                                                     │
│   PF10 Phone directory        Now in  Day of Year:[252]│
│   PF11 View main menu number 2  Menu-1          707 │
│   ───── MON-FRI(7:00-22:00) SAT(7:00-18:00) ─────   │
│                                            PF9 Help  PF12 End│
│                                               ┌──────────┐ │
│                                               │Mail Waiting│ 705│
│  ===>                                         └──────────┘ │
└─────────────────────────────────────────────────────┘ 700
```

```
┌─────────────────────────────────────────────────────┐
│ ☐ Registration of Exceptional Processing Screen / Procedure│
│   File    Edit  ─881                                │
│  Specifying Screen  Screen ID(Option) [        ] Service ID : X X X X X│
│     Screen Position  0       [  :  ] 803  801      │
│     Character Content        [            ]   805  │
│                          [Clear Entry][OK][Previous Content][Next Content]│
│  Special Condition        807     809    811      813│
│                              [        ]            │
│                                    [OK][Clear Entry]│
│                              815   817    819     │
│                                                     │
│  Specifying Input Variable                          │
│     Screen Position          [  :  ]  841           │
│     Variable ID              [      ]  843          │
│     Input Variable           [      ]  845          │
│                          [Clear Entry][OK][Previous Content][Next Content]│
│              857           847   849    851     853│
│  Event Type  [PF1 ▽] 859   [Execute] 855          │
│  [Regist. of Previous][Regist. of Next][Insert][Delete][End of Regist.]│
│        Screen            Screen                     │
│         871              873      875  877    879  │
└─────────────────────────────────────────────────────┘ 900
                                                      810
                                                      850
```

FIG. 9

```
┌──────────────────────────────────────────────────────────────┐
│ ☐  3270 Emulator  A                                          │
│ ┌──────┬──────┬──────────┬───────┬──────────┬──────┐         │
│ │ File │ Edit │ Transfer │ Setup │ Keyboard │ Help │         │
│ └──────┴──────┴──────────┴───────┴──────────┴──────┘         │
│  711  ┌Copy┐                              703   701          │
│ ─────────────── * Office System * ──────────────── [A00]     │
│                                          Time: [14]:19       │
│ Press one of the following PF keys.                          │
│  PF1  Process calendars                   1998 SEPTEMBER 1998│
│  PF2  Open the mail                       S  M  T  W  T  F  S│   700
│  PF3  Find documents                               1  2  3  4  5
│  PF4  Process notes and messagees  #1     6  7  8  9 10 11 12│
│  PF5  Prepare document                   13 14 15 16 17 18 19│
│  PF6  Add an automatic reminder          20 21 22 23 24 25 26│
│  PF7  Process the mail log               27 28 29 30         │
│  PF8  Service Utility (Org dir. etc.)                        │
│                                           Day of Year: [252] │
│  PF10 Phone directory           Now in                   707 │
│  PF11 View main menu number 2   Menu-1                       │
│                                        PF9 Help   PF12 End   │
│ ────── MON-FRI(7:00-22:00) SAT(7:00-18:00) ───────────────   │
│                                                         705  │
│                                               ┌Mail Waiting┐ │
│ ===>                                                         │
└──────────────────────────────────────────────────────────────┘

┌──────────────────────────────────────────────────────────────┐
│ ☐ Registration of Special Processing Screen / Procedure      │
│ ┌──────┬──────┐ 881                                          │     950
│ │ File │ Edit │                                              │
│ └──────┴──────┘                                              │
│ Specifying Input Variable            Service ID : X X X X X  │
│    Screen Position       [   :   ] 841                       │
│    Variable ID           [          ] 843                    │
│    Input Variable        [            ] 845                  │     850
│                     ┌Clear Entry┐ ┌OK┐ ┌Previous┐ ┌ Next  ┐  │
│                                       │Content │ │Content│   │
│        857           847   849    851       853             │
│ Event Type [PF1  ▽] 859       ┌Execute┐ 855                 │
│ ┌Regist. of Previous┐┌Regist. of Next┐ ┌Insert┐┌Delete┐ ┌End of Regist.┐
│ │    Screen         ││    Screen     │                   │              │
│        871                873         875     877         879
└──────────────────────────────────────────────────────────────┘
```

CONTROLLING AN INFORMATION PROCESSING APPARATUS

FIELD OF THE INVENTION

This invention relates to an information processing method and, more particularly, to an automatic execution method of an application.

BACKGROUND OF THE INVENTION

From the latter half of the 1970s to the 1990s, enterprises have built on-line applications executed by operation from character display terminals (IBM 3270s, Fujitsu 6650s, Hitachi 560/20s, or the like) for computerizing their key business services. While operational environments are rapidly changing in the recent years as evidenced by extensive use of GUI, development of the Web and the introduction of Mobile equipment, a majority of the host applications for key business services have not been substantially changed except for replacement of its character display terminals with PC emulators. This is because these applications are extremely large so that efforts of their modification are limited to maintenance and changes of business services rather than adapting them for changes of the operational environment.

By way of example, in a telephone ordering system of the mail-order industry, a member may use a push-button telephone to input his/her member number, a commodity number and the ordered number of the commodity, but a software application may not be able to handle these inputs. In such a case, the operator who receives the telephone call is required to reenter the inputted data into a host from his/her terminal.

While many of these processing procedures are fixed, there has been situations where execeptional screens occure due to disturbances caused by the host machine, or a communication line or the like, thereby requiring recovery by an operator. Many of the exceptional screens are generated in common with a plurality of host applications.

Providing an automatic execution program of a host application that is not capable of handling such exceptional screens, tends to continue potentially impossible processing even after the outputting of an exceptional screen. This would lead to increase of transactions to a host machines, thereby causing a busy condition of a host machine resource or a communication line to occur. Also, if a user is not informed of any cause of such impossible processing, he/she may apt to repeat the processing haphazardly and, thus, the busy condition of a host machine resource or a communication line would worsen.

On the other hand, as seen form the nature of an application that requires at shortage of commodities in stock to ship to the stocked commodities and to order the remaining commodities from a manufacturing section, there has been such processing that necessitates dynamically changing the involved processing procedures in accordance with content of data received from a host machine.

For this reason, what is strongly needed in the art is an automatic execution program that is capable of handling an exceptional processing procedure by of a client without changing a host application.

In order to improve client operation without changing host application, it may be required to automatically execute keyboard operations and to read necessary information from a screen by means of a program that uses "EHLLAPI" (trademark of IBM Corp.) of 3270 emulator (trademark of IBM Corp.). However, this approach requires that a host application program must be accurately understood and that an automatic execution program must be separately developed for each application.

This invention provides a procedure definition environment, enabling elimination of such program development and to access an existing host application from a new client application.

It is also known in the art to access a host machine from a client via a server machine and to obtain an output value, as disclosed in "Mobile Computer Agent, VersionJ1.1", Version 3, October 1996, IBM Japan (From No. SC88-3162-00). However, this technique is subject to a requirement that leads to substantial program development on the user side that necessarily casts burdens on the user to have a high level knowledge of programming to develop a program on his/her initiative. Further, this technique uses significants resources on the client side and it also requires to change a program content of an agent contained on the client side.

Further, it is known in the field of test tools or the like to record procedures and to re-execute the same, as disclosed in "VisualAge Test for OS/2, User's Guide for Autotest Performer, Version 1.0". March 1996, IBM Corp. (Form No. SC88-3149-00). However, this technique does not enable the provision of a value of an output variable to an application on the client side, nor dies it enable identification of specified exceptional screen or to take an operational procedure associated with such an exceptional screen.

It is, therefore, and object of this invention to provide an automatic execution system that is capable of handling an exceptional operation without changing or adapting an application program to be automatically executed.

It is another object of this invention to record an operational procedure without developing an automatic execution program for each application program to be automatically executed, thereby enabling the setting up of automatic execution of an application without requiring high level knowledge of programming.

It is another object of this invention to record an operational procedure without developing an automatic execution program for each application program to be automatically executed, thereby facilitating the setup of automatic execution of an application.

It is another object of this invention to provide an automatic execution system that is capable of dynamically changing an execution procedure in accordance with the nature of an application.

It is another object of this invention to provide an automatic execution system that is capable of dynamically changing an application to be executed in accordance with a user's request.

It is another object of this invention to provide an automatic execution system that is capable of automatically recovering fixed types of errors.

It is another object of this invention to provide an automatic execution system that is capable of reducing a gross amount of transactions occurring in a system.

It is another object of this invention to provide an automatic execution system that is capable of automatically executing an application even where a client machine is provided with a small storage capacity.

It is another object of this invention to provide an automatic execution system that reduces inputs required at a client machine.

It is another object of this invention to provide an automatic execution system that reduces the amount of data to be communicated between a client machine and a server machine.

It is another object of this invention to provide an automatic execution system that is capable of rapidly providing a processed result to a user.

It is another object of this invention to provide a system that is capable of automatically executing an application without depending on a platform of a client machine.

Means for Solving the Problems

For each screen appearing in an application to be automatically executed, information for specifying the screen (e.g., a screen number or a characteristic message) is recorded, whereby it is compared with another at the time of re-execution to confirm that the automatic execution is being carried out in accordance with a predetermined procedure. Also, in preparation for appearance of an exceptional screen, an action procedure (e.g., PA2 KEY) for each screen is recorded.

In accordance with an aspect of this invention, there is provided software for recording an operational procedure of a keyboard or screen designation of an input/output variable and, thus, an operation is capable of recording screen specifying data, input variable data and output variable data while an application is being executed.

In one aspect of this invention, there is provided an information processing that is executed based on a plurality of normal processing screen specifying data items that are stored in an ordered sequence, a plurality of normal processing input event specifying data items that are respectively associated with said plurality of normal processing screen specifying data items, an exceptional processing screen specifying data item, and an exceptional processing input event specifying data item that is associated with said exceptional processing screen specifying data item, the method being adapted for sending an event specified by one of said normal processing input event specifying data items or said exceptional processing input event specifying data item to an application for causing the same to generate a screen data item associated with the said event, comprising the steps of:

(a) sending an event specified by an "i"th ("i" is a natural number) normal processing input event specifying data item to said application for causing the same to generate a screen data item;

(b) determining whether or not said screen data item matches an "i+1"th normal processing screen specifying data item;

(c) if said screen data item matches said "i+1"th normal processing screen specifying data item, then sending an event specified by an "i+1"th normal processing input event specifying data item to said application;

(d) if said screen data item does not match said "i+1"th normal processing screen specifying data item, than determining whether or not said screen data item matches said exceptional processing screen specifying data item; and (e) if said screen data item matches said exceptional processing screen specifying data item, than sending an event specified by said exceptional processing input event specifying data item to said application.

Note here that, in the claims of the present specification, the expression "stored in an ordered sequence" represents a concept covering not only the case where the involved data items are stored in the order of their assigned sequential numbers, but also another case where such data items have such information (e.g., address information) that enables access to a next data item. Also, the expression "normal processing screen specifying data items" represents a concept covering a set of a screen position and a comparison content as well as a special condition (to be described below with reference to FIG. 3), but it may be such data items used for sorting out screen data items in accordance with certain conditions. Similarly, the expression "normal processing input event specifying data items" represents a concept covering an input value and an event type (to be described below with reference to FIG. 3), but it may be such data items used for determining an event to be outputted to the side of an application. Further, the expression "application" denotes a subject to be operated and it is not necessarily regarded as an essential constituent unless so mentioned explicity. Moreover, the expression "screen data item matches (normal) processing screen specifying data item" represents a concept covering not only a case where both data items completely match each other, but also another case where a relation between both data items is determined to satisfy a predetermined condition.

In another aspect of this invention, there is provided an information processing method executed based on a plurality of normal processing screen specifying data items that are stored in an ordered sequence, a plurality of normal processing input event specifying data items that are respectively associated with said plurality of normal processing screen specifying data items, an exceptional processing screen specifying data item, and an exceptional processing input event specifying data item that is associated with said exceptional processing screen specifying data item, the method being adapted for sending an event specified by one of said normal processing input event specifying data items or said exceptional processing input event specifying data item to an application for causing the same to generate a screen data item associated with the said event, comprising the steps of:

(a) sending an event specified by an "i"th ("i" is a natural number) normal processing input event specifying data item to said application for causing the same to generate a first screen data item;

(b) determining whether or not said first screen data item matches an "i+1"th normal processing screen specifying data item;

(c) if said first screen data item matches said "i+1"th normal processing screen specifying data item, then sending an event specified by an "i+1"th normal processing input event specifying data item to said application;

(d) if said first screen data item does not match said "i+1"th normal processing screen specifying data item, then determining whether or not said first screen data item matches said exceptional processing screen specifying data item;

(e) if said first screen data item matches said exceptional processing screen specifying data item, then sending an event specified by said exceptional processing input event specifying data item to said application for causing the same to generate a second screen data item;

(f) determining whether or not said second screen data item matches said "i+1"th normal processing screen specifying data item; and (g) if said second screen data item matches said "i+1"th normal processing screen specifying data item, then sending an event specified by said "i+1"th normal processing input event specifying data item to said application.

In another aspect of this invention, there is provided an information processing method executed based on a plurality of normal processing screen specified data items that are stored in an ordered sequence, a plurality of normal processing input event specifying data items that are respectively associated with said plurality of normal processing screen specifying data items, an interruption processing screen specifying data item, and an interruption processing input event specifying data item that is associated with said interruption processing screen specifying data item, the method being adapted for sending an event specified by one of said normal processing input event specifying data items or said interruption processing input event specifying data item to an application for causing the same to generate a screen data item associated with said event, comprising the steps of:

(a) sending an event specified by an "i"th ("i" is a natural number) normal processing input event specifying data item to said application for causing the same to generate a screen data item;

(b) determining whether or not said screen data item matches an "i+1"th normal processing screen specifying data item;

(c) if said screen data item matches said "i+1"th normal processing screen specifying data item, then sending an event specified by an "i+1"th normal processing input event specifying data item to said application;

(d) if said screen data item does not match said "i+1"th normal processing screen specifying data item, then determining whether or not said screen data item matches said interruption processing screen specifying data item; and (e) if said screen data item matches said interruption processing screen specifying data item, then sending an event specified by said interruption processing input event specifying data item to said application for indicating completion of the same.

In another aspect of this invention, there is provided an information processing method executed on an information processing apparatus based on a plurality of normal processing screen specifying data items that are stored in an ordered sequence and that belong to a first normal processing screen specifying data item group begin specifiable by a first normal processing screen specifying data item group's specifying data item, a plurality of normal processing input event specifying data items that are respectively associated with said plurality of normal processing screen specifying data items, a plurality of normal processing screen specifying data items that are stored in an ordered sequence and that belong to a second normal processing screen specifying data item group being specifiable by a second normal processing screen specifying data item group's specifying data item, and a plurality of normal processing input event specifying data items that are respectively associated with said plurality of normal processing screen specifying data items, the method being adapted for sending an event specified by one of said normal processing input event specifying data items to an application for indicating said information processing apparatus to process an exceptional processing screen specifying data item and said second normal processing screen specifying data item group that is associated with said exceptional processing screen specifying data item, comprising the steps of:

(a) sending an event specified by an "i"th ("i" is a natural number) normal processing input event specifying data item that belongs to said application for causing the same to generate a screen data item;

(b) determining whether or not said screen data item matches an "i+1"th normal processing screen specifying data item that belongs to said first normal processing screen specifying data item group;

(c) if said screen data item matches said "i+1"th normal processing screen specifying data item that belongs to said first normal processing screen specifying data item group, then sending an event specified by an associated "i+1"th normal processing input event specifying data item to said application;

(d) if said screen data item does not match said "i+1"th normal processing screen specifying data item that belongs to said first normal processing screen specifying data item group, then determining whether or not said screen data item matches said exceptional processing screen specifying data item; and (e) if said screen data item matches said exceptional processing screen specifying data item, then sending an event specified by said exceptional processing input event specifying data item for indicating to process said second normal processing screen specifying data item group.

Note here that, in the claims of the present specification, the expression "normal processing screen specifying data item group's specifying data item" represents a concept covering a service ID to be described below.

In another aspect of this invention, there is provided an information processing method executed on an information processing apparatus that is communicable with a client machine based on a plurality of normal processing screen specifying data items that are stored in an ordered sequence, and a plurality of normal processing input event specifying data items that are respectively associated with said plurality of normal processing screen specifying data items, the method being adapted for sending an event specified by one of said normal processing input event specifying data to an application for causing the same to generate a screen data item associated with the said event, extracting from said screen data item an output variable specified by one of normal processing output variable specifying data items that are respectively associated with said plurality of normal processing screen specifying data items, and sending the extracted output variable to said client machine, comprising the steps of:

(a) sending an event specified by an "i"th ("i" is a natural number) normal processing input event specifying data item to said application for causing the same to generate a screen data item;

(b) determining whether or not said screen data item matches an "i+1"th normal processing screen specifying data item;

(c) if said screen data item matches said "i+1"th normal processing screen specifying data item, then extracting from said screen data item an output variable specified by one of said normal processing output variable specifying data items that is associated with said "i+1"th normal processing screen specifying data item; and (d) sending the said extracted output variable to said client machine.

In another aspect of this invention, there is provided an information processing method executed on an information processing apparatus that is communicable with a host machine based on a plurality of normal processing screen specifying data items that are stored in an ordered sequence, a plurality of normal processing input event specifying data items that are respectively associated with said plurality of normal processing screen specifying data items, an exceptional processing screen specifying data item, and an exceptional processing input event specifying data item that is associated with said exceptional processing screen specifying data item, the method being adapted for sending an event specified by one of said normal processing input event specifying data item or said exceptional processing input event specifying data item to an application on said host machine for causing said application to generate a screen data item associated with the said event, comprising the steps of:

(a) sending an event specified by an "i"th ("i" is a natural number) normal processing input event specifying data item to said application for causing the same to generate a screen data item;

(b) determining whether or not said screen data item matches an "i+1"th normal processing screen specifying data item;

(c) if said screen data item matches said "i+1"th normal processing screen specifying data item, then sending an event specified by an "i+1"th normal processing input event specifying data item to said application;

(d) if said screen data item does not match said "i+1"th normal processing screen specifying data item, then determining whether or not said screen data item matches said exception processing screen specifying data item; and (e) if said screen data item matches said exceptional processing screen specifying data item, then sending an event specified by said exceptional processing input event specifying data item to said application.

In another aspect of this invention, there is provided an information processing method executed on an information processing apparatus that is communicable with a host machine and a client machine based on a plurality of normal processing screen specifying data items that are stored in an ordered sequence and that belong to one of plurality of normal processing screen specifying data item groups each being specified by one of normal processing screen specifying data item group's specifying data items, a plurality of normal processing input event specifying data items that are respectively associated with said plurality of normal processing screen specifying data items, an exceptional processing screen specifying data item, and an exceptional processing input event specifying data item that is associated with said exceptional processing screen specifying data item, the method being adapted for sending an event specified by one of said normal processing input event specifying data items or said exceptional processing input event specifying data item to an application on said host machine for causing said application to generate a screen data item associated with the said event, comprising the steps of:

(a) receiving one of said normal processing screen specifying data item group's specifying data items from said client machine;

(b) sending an event specified by an "i"th ("i" is a natural number) normal processing input event specifying data item that belongs to one of said plurality of normal processing screen specifying data item groups that is specified by the said received normal processing screen specifying data item group's specifying data item to said application for causing the same to generate a screen data item;

(c) determining whether or not said screen data item matches an "i+1"th normal processing screen specifying data item that belongs to the said specified normal processing screen specifying data item group;

(d) if said screen data item matches said "i+1"th normal processing screen specifying data item that belongs to said specified normal processing screen specifying data item group, then extracting from said screen data item an output variable specified by an associated normal processing output variable specifying data item, and sending the said extracted output variable to said client machine;

(e) if said screen data item does not match said "i+1"th normal processing screen specifying data item that belongs to said specified normal processing screen specifying data item group, then determining whether or not said screen data item matches said exceptional processing screen specifying data item; and (f) if said screen data item matches said exceptional processing screen specifying data item, then sending an event specified by said exceptional processing input event specifying data item to said application.

In another aspect of this invention, there is provided an information processing apparatus for accessing a screen/procedure library that stores a plurality of ordered normal processing screen specifying data items, a plurality of normal processing input event specifying data items being respectively associated with said plurality of normal processing screen specifying data items, an exceptional processing screen specifying data item, and an exceptional processing input event specifying data item being associated with said exceptional processing screen specifying data item, the apparatus being adapted for sending an event specified by one of said normal processing input event specifying data items or said exceptional processing input event specifying data item to an application for causing the same to generate a screen data item associated with the said event, comprising:

(a) screen comparison/determination means for determining whether or not a screen data item, which is generated as a result of sending an event specified by an "i"th ("i" is a natural number) normal processing input event specifying data item to said application, matches an "i+1"th normal processing screen specifying data item; and (b) procedure execution means, being responsive to a determination that said screen data item matches said "i+1"th normal processing screen specifying data item, fir sending an event specified by an "i+1"th normal processing input event specifying data item to said application;

(c) wherein if said screen data item does not match said "i+1"th normal processing screen specifying data item, said screen comparison/determination means further determines whether or not said screen data item matches said exceptional processing screen specifying data item; and (d) wherein if said screen data item matches said exceptional processing screen specifying data item, said procedure execution means further sends an event specified by said exceptional processing input event specifying data item to said application.

In another aspect of this invention, there is provided an information processing apparatus communicably connected to a client machine for accessing a screen/procedure library that stores a plurality of ordered normal processing screen specifying data items, and a plurality of normal processing input event specifying data items being respectively associated with said plurality of normal processing screen specifying data items, the apparatus being adapted for sending an event specified by one of said normal processing input event specifying data items to an application for causing the same to generate a screen data item associated with the said event, extracting from said screen data item an output variable specified by one of normal processing output variable specifying data items that are respectively associated with said plurality of normal processing screen specifying data items, and sending the extracted output variable to said client machine, comprising:

(a) screen comparison/determination means for determining whether or not a screen data item, which is generated as a result of sending an event specified by an "i"th ("i" is a natural number) normal processing input event specifying data item to said application, matches an "i+1"th normal processing screen specifying data item, and if said screen data item matches said "i+1"th normal processing screen specifying data item, then extracting from said screen data item an output variable specified by one of said normal processing output variable specifying data items that is associated with said "i+1"th normal processing screen specifying data item; and (b) output generating means for sending the said extracted output variable to said client machine.

In another aspect of this invention, there is provided an information processing apparatus communicably connected to a host machine for accessing a screen/procedure library that stores a plurality of ordered normal processing screen specifying data items, a plurality of normal processing input event specifying data items being respectively associated with said plurality of normal processing screen specifying data items, an exceptional processing screen specifying data item, and an exceptional processing input event specifying data item being associated with said exceptional processing screen specifying data item, the apparatus being adapted for sending an event specified by one of said normal processing input event specifying data items or said exceptional processing input event specifying data item to an application on said host machine for causing said application to generate a screen data item associated with the said event, comprising:

(a) screen comparison/determination means for determining whether or not a screen data item, which is generated as a result of sending an event specified by an "i"th ("i" is a natural number) normal processing input event specifying data item to said application, matches an "i+1"th normal processing screen specifying data item; and (b) procedure execution means, being responsive to a determination that said screen data item matches said "i+1"th normal processing screen specifying data item, for sending an event specified by an "i+1"th normal processing input event specifying data item to said application;

(c) wherein if said screen data item does not match said "i+1"th normal processing screen specifying data item, said screen comparison/determination means further determines whether or not said screen data item matches said exceptional processing screen specifying data item; and (d) wherein if said screen data item matches said exceptional processing screen specifying data item, said procedure execution means further sends an event specified by said exceptional processing input event specifying data item to said application.

In another aspect of this invention, there is provided an information processing system, comprising:

(a) a screen/procedure library for storing a plurality of ordered normal processing screen specifying data items, a plurality of normal processing screen specifying data item groups each being specified by one of normal processing screen specifying data item group's specifying data items, a plurality of normal processing input event specifying data items being respectively associated with said plurality of normal processing screen specifying data items, an exceptional processing screen specifying data item, and an exceptional processing input event specifying data item being associated with said exceptional processing screen specifying data item;

(b) a client machine for sending one of said normal processing screen specifying data item group's specifying data items;

(c) a server machine for receiving said normal processing screen specifying data item groups's specifying data item, and sending an event specified by an "i"th ("i" is a natural number) normal processing input event specifying data item that belongs to one of said plurality of normal processing screen specifying data item groups that is specified by the said received normal processing screen specifying data item group's specifying data item; and (d) a host machine having an application for generating a screen data item upon receipt of the said received event; wherein said server machine is further arranged to perform the following operations:

(e) determining whether or not said screen data item matches an "i+1"th normal processing screen specifying data item that belongs to the said specified normal processing screen specifying data item group;

(f) if said screen data item matches said "i+1"th normal processing screen specifying data item that belongs to said specified normal processing screen specifying data item group, then extracting from said screen data item an output variable specified by an associated normal processing output variable specifying data item, and sending the said extracted output variable to said client machine;

(g) if said screen data item does not match said "i+1"th normal processing screen specifying data item that belongs to said specified normal processing screen specifying data item group, then determining whether or not said screen data item matches said exceptional processing screen specifying data item; and (h) if said screen data item matches said exceptional processing screen specifying data item, then sending an event specified by said exceptional processing input event specifying data item to said application.

In another aspect of this invention, there is provided a storage medium for storing a program readable and executed by an information processing apparatus to implement an information processing method based on a plurality of normal processing screen specifying data items that are stored in an ordered sequence, a plurality of normal processing input event specifying data items that are respectively associated with said plurality of normal processing screen specifying data items, an exceptional processing screen specifying data item, and an exceptional processing input event specifying data item that is associated with said exceptional processing screen specifying data item, the method being adapted for sending an event specified by one of said normal processing input event specifying data items or said exceptional processing input event specifying data item to an application for causing the same to generate a screen data item associated with the said event, said program comprising:

(a) program code means for indicating said information processing apparatus to send an event specified by an "i"th ("i" is a natural number) normal processing input event specifying data item to said application, thereby causing the same to generate a screen data item;

(b) program code means, being responsive to the said event, for indicating said information processing apparatus to determine whether or not said screen data item matches an "i+"th normal processing screen specifying data item;

(c) program code means, being responsive to a determination that said screen data item matches said "i+1"th normal processing screen specifying data item, for indicating said information processing apparatus to send an event specified by an "i+1"th normal processing input event specifying data item to said application;

(d) program code means, being responsive to a determination that said screen data item does not match said "i+1"th normal processing screen specifying data item, for indicating said information processing apparatus to determine whether or not said screen data item matches said exceptional processing screen specifying data item; and (e) program code mean, being responsive to a determination that said screen data item matches said exceptional processing screen specifying data item, for indicating said information processing apparatus to send an event specified by said exceptional processing input event specifying data item to said application.

In another aspect of this invention, there is provide a storage medium for storing a program readable and execute by an information processing apparatus that is communicable with a client machine to implement an information processing method based on a plurality of normal processing screen specifying data items that are stored in an ordered sequence, and a plurality of normal processing input event specifying data items that are respectively associated with said plurality of normal processing screen specifying data items, the method being adapted for sending an event specified by one of said normal processing input event specifying data items to an application for causing the same to generate a screen data item associated with the said event, extracting from said screen data item an output variable specified by one of normal processing output variable specifying data items that are respectively associated with said plurality of normal processing screen specifying data items, and sending the extracted output variable to said client machine, said program comprising:

(a) program code means for indicating said information processing apparatus to send an event specified by an "i"th ("i" is a natural number) normal processing input event specifying data item to said application, thereby causing the same to generate a screen data item;

(b) program code means for indicating said information processing apparatus to determine whether or not said screen data item matches an "i+1"th normal processing screen specifying data item;

(c) program code means, being responsive to a determination that said screen data item matches said "i+1"th normal processing screen specifying data item, for indicating said information processing apparatus to extract from said screen item an output variable specified by one of said normal processing output variable specifying data items that is associated with said "i+1"th normal processing screen specifying data item; and (d) program code means for indicating said information processing apparatus to send the said extracted output variable to said client machine.

In another aspect of this invention, there is provided a storage medium for storing a program readable and executed by an information processing apparatus that is communicable with a host machine to implement an information processing method based on a plurality of normal processing screen specifying data items that are stored in an ordered sequence, a plurality of normal processing input event specifying data items that are respectively associated with said plurality of normal processing screen specifying data items, an exceptional processing screen specifying data item, and an exceptional processing input event specifying data item that is associated with said exceptional processing screen specifying data item, the method being adapted for sending an event specified by one of said normal processing input event specifying data items or said exceptional processing input event specifying data item to an application on said host machine for causing said application to generate a screen data item associated with the said event, said program comprising:

(a) program code means for indication said information processing apparatus to send an event specified by an "i"th ("i" is a natural number) normal processing input event specifying data item to said application for causing the same to generate a screen data item;

(b) program code mean for indicating said information processing apparatus to determine whether or not screen data item matches an "i+1"th normal processing screen specifying data item;

(c) program code means, being responsive to a determination that said screen data item matches said "i+1"th normal processing screen specifying data item, for indicating said information processing apparatus to send an event specified by an "i+1"th normal processing input event specifying data item to said application;

(d) program code mean, being responsive to a determination that said screen data item does not match said "i+1"th normal processing screen specifying data item, for indicating said information processing apparatus to determine whether or not said screen data item matches said exceptional processing screen specifying data item; and (e) program code mean, being responsive to a determination that said screen data item matches said exceptional processing screen specifying data item, for indicating said information processing apparatus to send an event specified by said exceptional processing input event specifying data item to said application.

In another aspect of this invention, there is provided an information processing method executed on an information processing apparatus that has a display device and screen holding mean for holding a screen data item generated by an application, comprising the steps of:

(a) displaying, on said display device, a screen specifying entry for inputting a character content for specifying said screen data item and a screen position, as well as an output variable specifying entry for inputting a screen position for specifying an output variable to be extracted from said screen data item and an output variable identifier for specifying the said output variable;

(b) storing information inputted by an operator into said screen specifying entry as a screen specifying data item;

(c) storing information inputted by the operator into said output variable specifying entry as an output variable specifying data item; and (d) generating an input variable data item based on an event that is generated in response to an input event specifying operation inputted by the operator into said information processing apparatus, and storing the generated input variable data item.

Note here that, in the claims of the present specification, the expression "input event specifying operation" represents a concept covering not only a case where designation of a type of a key (e.g., an execution/transmission key, a PF key, a combination of a concurrently depressed shift key and a PA1 Key) to be inputted into an entry for specifying an event type and subsequent depression of an execution button are carried out (as described below with reference to an embodiment), but also another case where keys of a keyboard are actually operated for inputting.

In another aspect of this invention, there is provided a storage medium for storing a program readable and executed by an information processing apparatus that has a display device and screen data holding means for holding a screen data item generated by an application, said program comprising:

(a) program code means for indicating said information processing apparatus to display, on said display device, a screen specifying entry for inputting a character content for specifying said screen data item and a screen position, as well as an output variable specifying entry for inputting a screen position for specifying an output variable to be extracted from said screen data item and an output variable identifier for specifying the said output variable;

(b) program code means for indicating said information processing apparatus to store information inputted by an operator into said screen specifying entry as a screen specifying data item;

(c) program code means for indicating said information processing apparatus to store information inputted by the operator into said output variable specifying entry as an output variable specifying data item; and (d) program code means for indicating said information processing apparatus to generate an input variable data item based on an event that is generated in response to an input event specifying operation inputted by the operator into said information processing apparatus, and to store the generated input variable data item.

BRIEF DESCRIPTION OF THE DRAWINGS

FIG. 7 is a diagram showing a user interface for registering normal processing screen/procedure data in a preferred embodiment of this invention.

FIG. 8 is a diagram showing a user interface for registering exceptional processing screen/procedure data in a preferred embodiment of this invention.

FIG. 9 is a diagram showing a user interface for registering special processing procedure data in a preferred embodiment of this invention.

DESCRIPTION OF AN EMBODIMENT OF THE INVENTION

Figure 1:
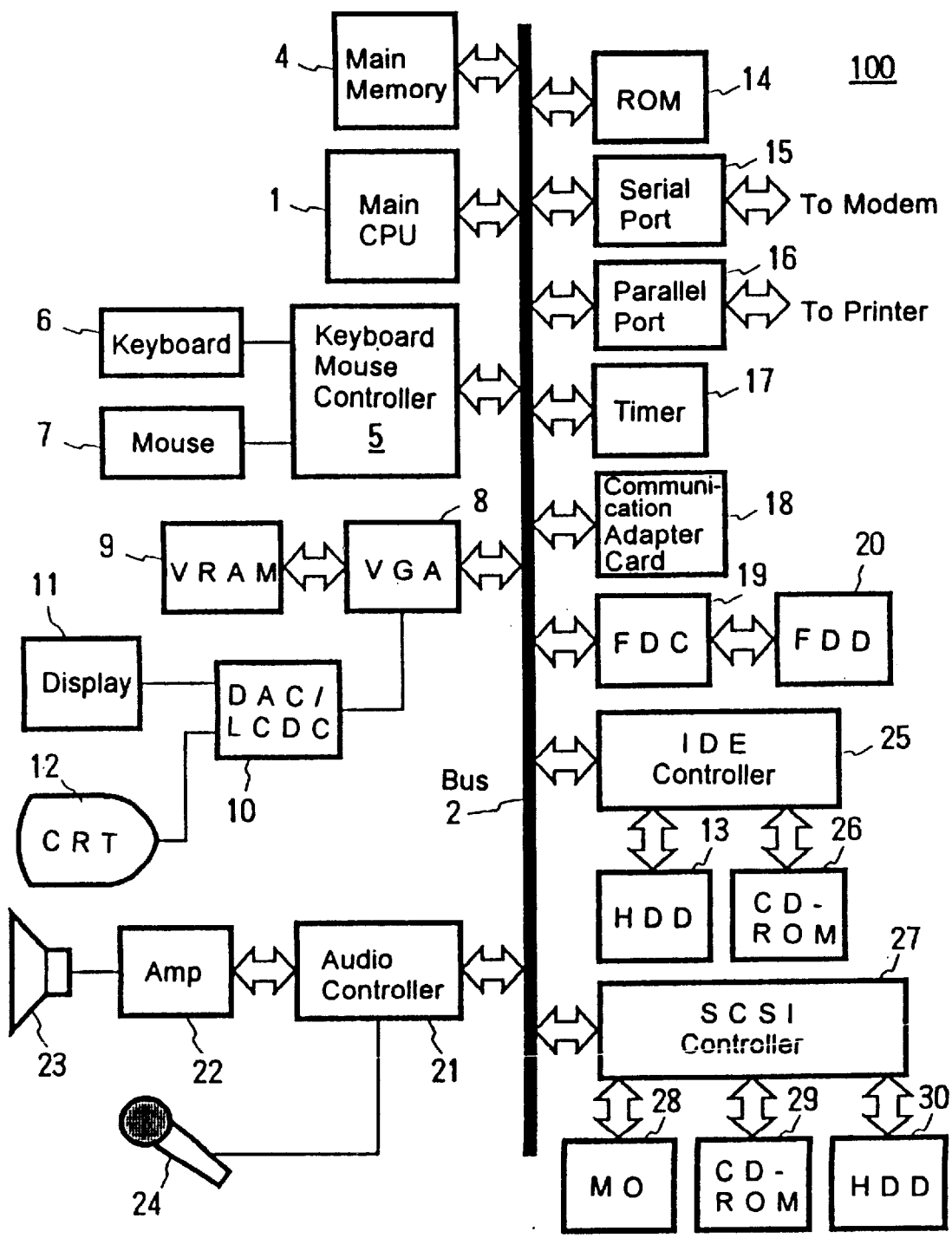
FIG. 1 is a block diagram showing a hardware configuration of a server machine or a client machine in accordance with this invention.

Now, with reference to the drawings, an embodiment of this invention will be described. Referring to FIG. 1, there is schematically shown a hardware configuration of a server machine 100 used in this invention. The server machine 100 includes a central processing unit (CPU) 1 and a memory 4. CPU 1 and the memory 4 are connected to a hard disk drive 13 as an auxiliary storage device via a bus 2. A floppy disk drive (or another storage medium drive such as an MO drive, a CD-ROM drive or the like) 20 is connected to the bus 2 via a floppy disk controller 19 (or an IDE controller, a SCSI controller or the like).

A floppy disk (or another storage medium such as an MO disk, a CD-ROM or the like) inserted into the floppy disk drive (or another storage medium drive such as an MO drive, a CD-ROM drive or the like) 20, the hard disk drive 13 and/or a ROM 14 is capable of storing a computer program code for practicing this invention. At the time of execution, this computer program code is loaded into the memory 4 such that it cooperates with an operating system to provide instructions to CPU or the like. This computer program code may be compressed or divided into a plurality of segments for storing onto a plurality of media.

Also, the server machine 100 may be provided with user interface hardware, including a pointing device (such as a mouse, joystick or the like) 7 or a keyboard 6 for input entry, as well as a display 12 for presenting visual data to a user. Also, a printer and a modem may be connected via a parallel port 16 and a serial port 15 respectively. This server machine 100 may be connected to a network via the serial port 15 and a modem or a communication adapter 18 (Ethernet or token ring card) for communicating with other computers or the like.

A speaker 23 receives audio signals that are D/A (digital/analog) converted by an audio controller 21 via an amplifier 22, and outputs the audio signals as sounds. Also, the audio controller 21 may perform an A/D conversion of audio information received from a microphone 24, thereby to capture the external audio information into the system.

It will be readily understood from the foregoing that the server machine 100 of this invention may be implemented by computers having communication functions, including a conventional personal computer (PC), a communication terminal having communication functions including a network computer or the like, and any combinations thereof. Note, however, that these elements are listed for exemplification purpose only, and all of these elements are not necessarily equated with essential elements of this invention.

In particular, since the hardware configuration explained here is merely required for executing a program specified by a client machine, those elements listed below are non-essential elements. They are: audio controller 21, amplifier 22, speaker 23 and microphone 24 used for audio processing, keyboard 6, mouse 7 and keyboard/mouse controller 5 used for direct input entry from an operator; CRT 12, a display device 11, VRAM 9 and VGA 8 used for presenting visual data to a user; and a variety of storage medium controllers 19, 25, 27 and the like.

It will be readily understood by those skilled in the art that various modifications to respective elements of this server machine 100, including but not limited to combining a plurality of machines and distributing implemented functions among these machines, may be made without departing from the spirit and scope of the concept of this invention.

A terminal for remote operations to be used in this invention (FIG. 2, client machine 150) may be implemented by the hardware configuration as shown in FIG. 1 in the same manner as the server machine 100. That is, since the client machine 150 requires limited functions for specifying an application to be automatically executed and originating the same, it will be readily understood by those skilled in the art that the client machine 150 may be implemented by a conventional personal computer (PC), a workstation, a notebook PC, a palm top PC, a variety of household electric appliances such as TV sets incorporating computers, a game machine having communication functions, a communication terminal having communication functions including a telephone, a FAX machine, a mobile telephone, a PHS, an electronic memorandum book or the like, and combinations thereof.

Note, however, that these elements are listed for exemplification purpose only, and all of these elements are not necessarily equated with essential elements of this invention. Non-essential elements are: audio controller 21, amplifier 22, speaker 23 and microphone 24 used for audio processing, keyboard 6, mouse 7 and keyboard/mouse controller 5 used for direct input entry from an operator; CRT 12, a display device 11, VRAM 9 and VGA 8 used for presenting visual data to a user; a variety of storage medium controllers 19, 25, 27 and the like.

An operating system on the server machine 100 is not limited to a particular operating system environment and it may be implemented by: those supporting a GUI multi-window environment such as "WindowsNT" (trademark of Microsoft Corp.), "Windows95" (trademark of Microsoft Corp.) "Windows3.x" (trademark of Microsoft Corp.), "OS/2" (trademark of IBM Corp.), "MacOS" (trademark of Apple Computer, Inc.), "X-WINDOWS system" (trademark of MIT) on "AIX" (trademark of IBM Corp.) or the like; those supporting a character base environment such as "PC-DOS" (trademark of IBM Corp.), "MS-DOS" (trademark of Microsoft Corp.) or the like; those categorized as real-time OS such as "OS/Open" (trademark of IBM Corp.), "VxWorks" (trademark of Wind River Systems, Inc.) or the like; those embedded into a network computer such as "JavaOS" or the like.

Similarly, an operating system on the client machine 150 is not limited to a particular operating system environment and it may be implemented by: those supporting a GUI multi-window environment such as "WindowsNT" (trademark of Microsoft Corp.), "Windows95" (trademark of Microsoft Corp.), "Windows3.x" (trademark of Microsoft Corp.), "OS/2" (trademark of IBM Corp.), "MacOS" (trademark of Apple Computer, Inc.), "X-WINDOWS system" (trademark of MIT) on "AIX" (trademark of IBM Corp.) or the like; those supporting a character base environment such as "PC-DOS" (trademark of IBM Corp.), "MS-DOS" (trademark of Microsoft Corp.) or the like; those categorized as real-time OS such as "OS/Open" (trademark of IBM Corp.), "VxWorks" (trademark of Wind River Systems, Inc.) or the like; those embedded into a network computer such as "JavaOS" or the like; and a chip-card OS being used in the "DataScope" that is not capable of handling a file or the like.

B. System Configuration

Next, with reference to a block diagram of FIG. 2, a system configuration in a preferred embodiment of this invention will be described. The client machine 150 is provided with communication functions of a PHS, a mobile telephone or the like, thereby to access the server machine 100 connected to a network.

A terminal emulator 101, definition means 110 and execution means 120 are running on an operating system (OS) 105 of the server machine 100.

The terminal emulator 101 transmits input information from a keyboard or the like toward a host machine 140 as its input information. Also, it transmits information such as screen data or a cursor position to the definition means 110 and/or the execution means 120.

The definition means 110 comprises a procedure execution means 117 and a definition control means 111. The definition control means 111 interprets an operator input entered from an input means 115 and passes a parameter of an event to the procedure execution means 117 for sending it to a host application 141. Also, this means 111 specifies screen specifying data, output variable data, input variable data or the like in accordance with an operator input for storing the same into a screen/procedure registration library 130.

The procedure execution means 117 generates an event to be sent to the host application 141 in accordance with an indication from the definition control means 111, sends it toward the host machine 140 via the terminal emulator 101, and monitors the terminal emulator 101 for receipt of screen data from the host machine 140. Screen data so received is then passed to the definition control means 111 for displaying on a display means 113. If a plurality of terminal emulators 101 are running, an associated one of them is specified.

An, execution means 120 comprises an execution control means 127, a procedure execution means 121, a screen comparison/determination means 123, and an output data generating means 125.

The execution control means 127 monitors arrival of an automatic execution command message sent from the client machine 150, and temporality stores information (e.g., a parameter for specifying an input variable, an output variable or the like) for controlling the procedure execution means 121 in an input data holding means 131.

The execution control means 127 is arranged to carry out an authentication process by matching a user ID and a password included in an automatic execution command message sent from the client machine 150 with a registration list (not shown). Further, in a case where it is desired to support a plurality of client machines 150, this means 127 is arranged to generate a new thread in response to arrival of an automatic execution command message, thereby causing the procedure execution means 121, the screen comparison/determination means 123, and the output data generating means 125 to be operated.

The screen comparison/determination means 123 determines whether or not screen data held in a screen data holding means 103 matches screen specifying data extracted from the screen/procedure registration library 130 based on a given condition (to be described below) and, if they match, it extracts input variable data related to this screen specifying data and passes the same to the procedure execution means 121. If, at the same time, there exists a corresponding variable or a special instruction within the input data holding means 131, such input variable data is converted in accordance with content of this means 131 and is subsequently passed to the procedure execution means 121.

Also, if screen data held in the screen data holding means 103 matches this screen specifying data, this means 123 determines whether or not output variable data related to this screen specifying data is defined and, if so, it carries out a specified conversion (if such a conversion is defined) and temporarily stores this output variable into an output data holding means 132.

The output data generating means 125 extracts the output variable from the output data holding means 132, based on designation of the output variable, a conversation logic and the like (if they are defined), converts it to a replay message, and sends it toward the client machine 150.

While, at this time, this means 125 sends a reply message to a sending source that is designated in an automatic execution command message sent from the client machine 150, it may send the reply message to another destination as well if such another destination is designated. Also, as disclosed in Japanese Patent Application H9-136232, the reply message may be converted to an electronic mail for sending it to a designated destination.

Figure 2:
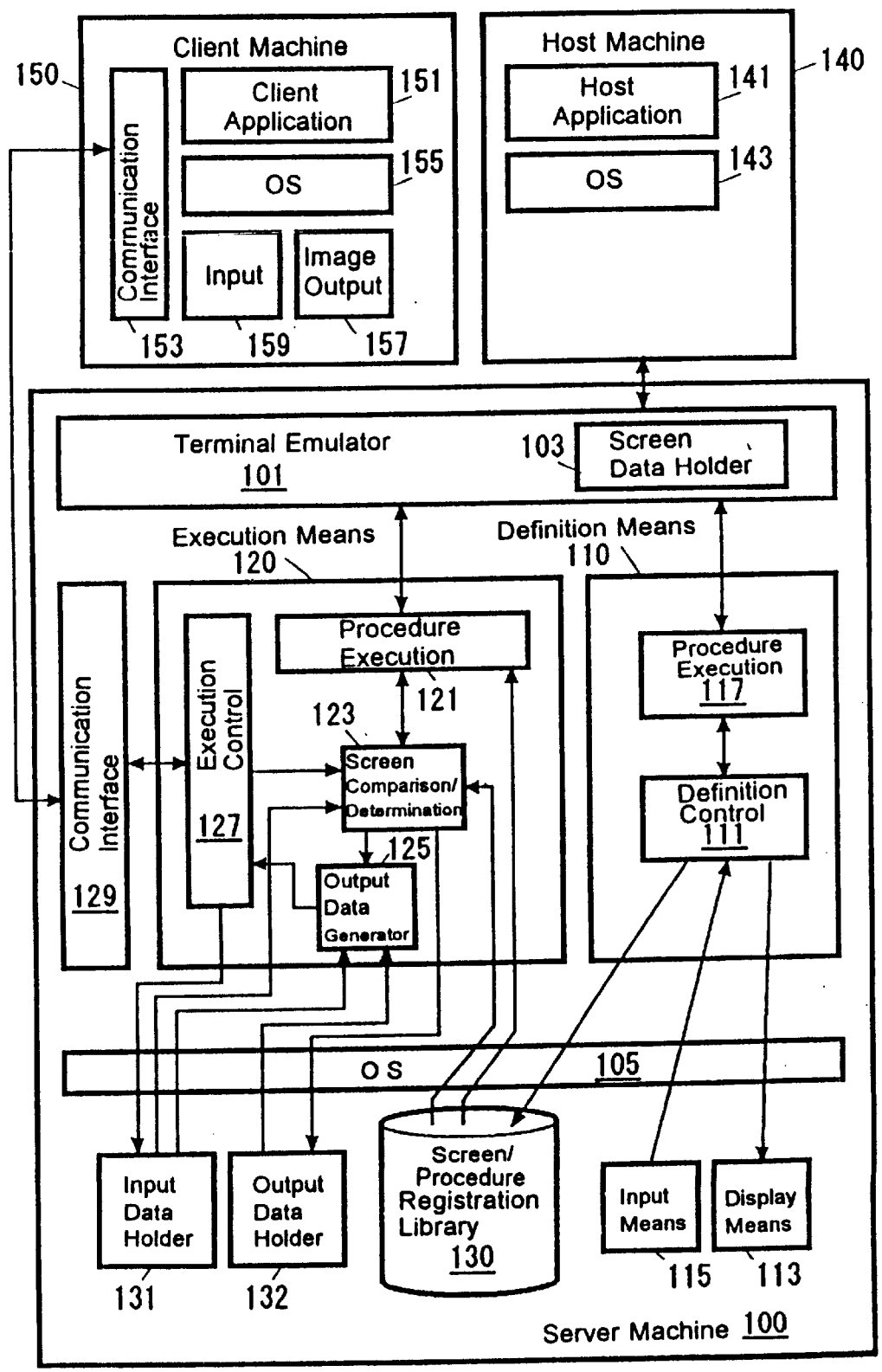
FIG. 2 is a block diagram showing a structure of an automatic execution system in a preferred embodiment of this invention.

While FIG. 2 illustrates an environment where registration of screen/procedure and its execution are carried out on a single machine, in another environment where these operations are carried out on separate machines respectively, one of the machines for use in registration of screen/procedure does not need the execution means 120 and a communication interface 129, the input data holding means 131, and the output data holding means 132. On the other hand, the other machine for use in execution does not need the input means 115, the display means 113, the definition means 110 and the like. Similarly, the screen/procedure registration library 130 may comprise a memory means provided externally or internally to either machine.

Further, while FIG. 2 illustrates a case where the server machine 100 is rendered to automatically execute the host application 141 on the host machine 140 based on an automatic execution command message sent from the client machine 150, it is noted that a client application 151 is not an essential element in one aspect of this invention, nor is there any need for the host application 141 to be an application on the host machine 140 since it may be an application on the server machine 100 or another machine.

Automatic execution of an application on said another machine may be done by installing the presently available software for remote operations rather than the terminal emulator 101 on the server machine 100. In doing so, it is possible to access a PC (personal computer) or the like installed at home or the like, thereby obtaining information contained therein (for example, scheduling information of upper managers and internet/intranet information resident at a "Notes" server (trademark of Lotus Development Corp.), materials for use in a meeting which have been prepared by a desktop at home).

While each functional blocks shown in FIG. 2 has been described above, it is noted that these blocks are logical functional blocks. Thus, each of them is not necessarily implemented by bulky hardware/software components, but it may be implemented by combined or common hardware/software components. Note also that all of the functional blocks shown in FIG. 2 are not necessarily regarded as essential elements of this invention.

For example, in case of supporting a single client, the execution control means 127 may be eliminated as a non-essential element if the screen comparison/determination means 123 is provided with a monitoring function of an automatic execution command message sent from the client machine 150 and if the input data holding means 131 is provided with a temporary storage function.

Also, in an environment where the client application 151 exists on the same server machine 100 or in another environment where there is not client application 151 at all, the server machine 100 does not need the communication interface 129 as its essential element. Further, in yet another environment where the host application 141 exists on the same server machine 100, it may be sufficient to provide the screen data holding means 103, and the terminal emulator 101 may be eliminated as a non-essential element.

C. Registration of Screen/Procedure

In order to carry out automatic execution of this invention, it is necessary as a preparatory work to register information for monitoring/controlling automatic execution into the screen/procedure registration library 130.

C-1. Summary of Registration

As described, in order to confirm that automatic execution is being carried out in accordance with a predetermined procedure, it is necessary to record screen specifying information (e.g., a screen number or a characteristic message) for each screen appearing in an application to be automatically executed, whereby it is compared with another at the time of re-execution.

For this purpose, as normal processing, three different types of data (i.e., screen specifying data for specifying each screen, input variable data for changing to a next screen, and output variable data extracted from the screen for utilizing the operational result) is registered into the system.

Also, in preparation for appearance of an exceptional screen, it is necessary to record an action procedure for each screen. For this purpose, as exceptional processing, two different types of data (i.e., screen specifying data for specifying an exceptional screen and input variable data for handling this exceptional screen) is registered into the system.

Note also that in one aspect of this invention, it is possible to execute a special procedure in preparation for appearance of an unexpected screen and, as this special procedure, input variable data is registered into the system.

C-2. Content of Registration

Figure 3:
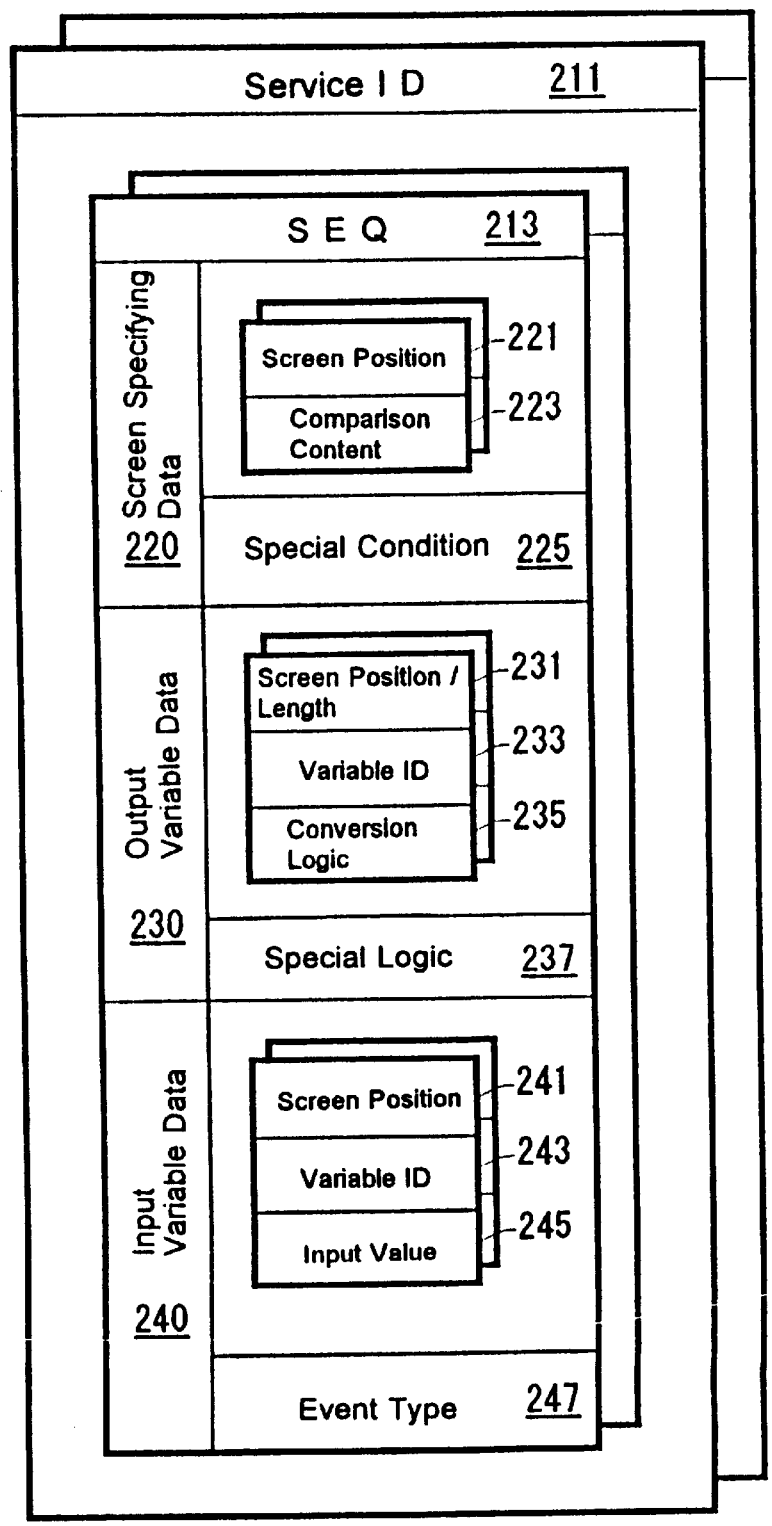
FIG. 3 is a conceptual diagram showing normal processing screen/procedure data in a preferred embodiment of this invention.
Figure 4:
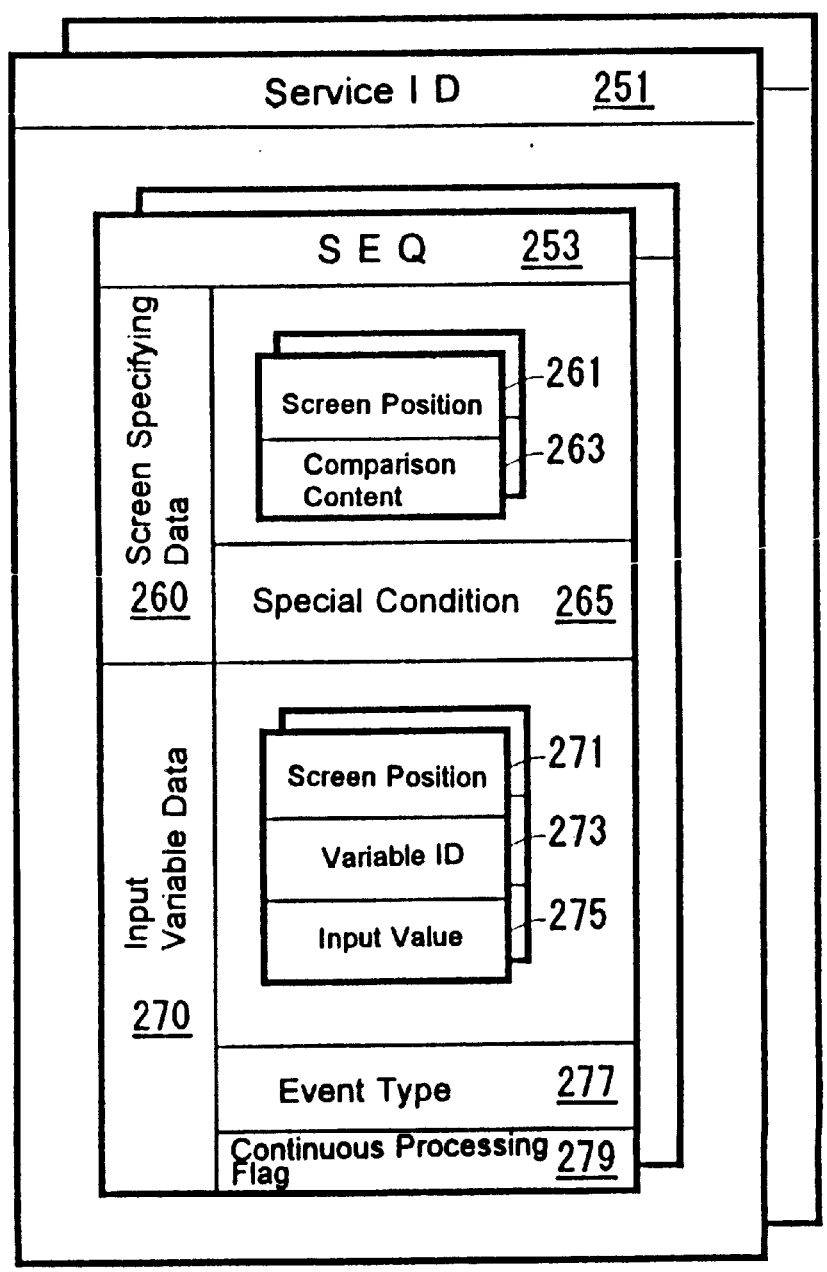
FIG. 4 is a conceptual diagram showing exceptional processing screen/procedure data in a preferred embodiment of this invention.
Figure 5:
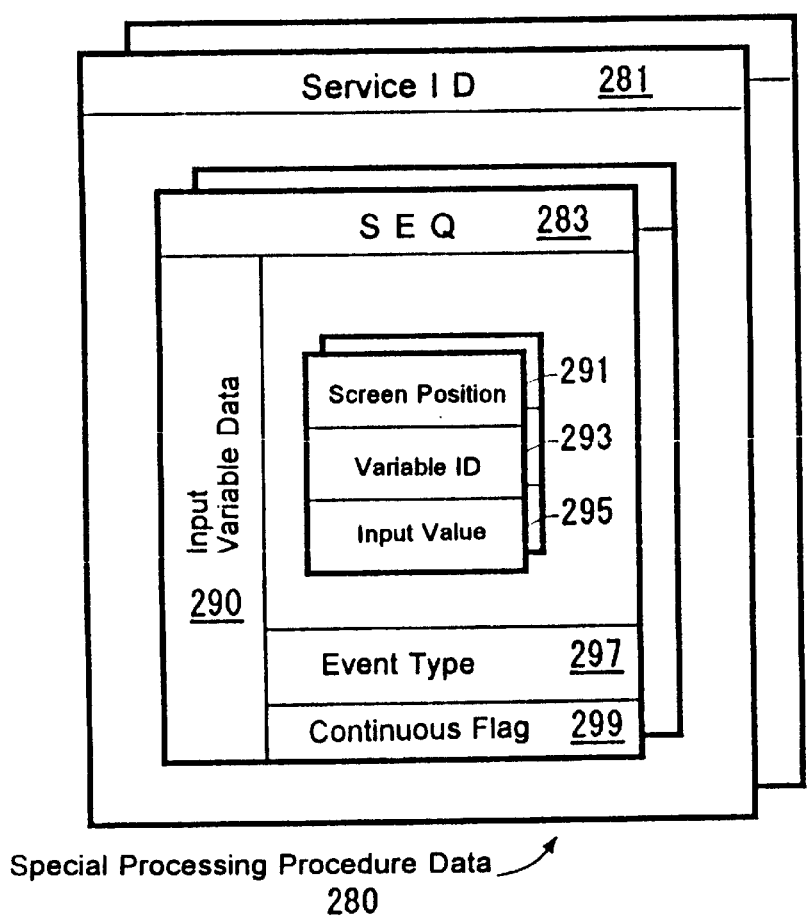
FIG. 5 is a conceptual diagram showing special processing procedure data in a preferred embodiment of this invention.

FIGS. 3 to 5 are conceptual diagrams showing normal processing screen/procedure data 210, exceptional processing screen/procedure data 250, and special processing procedure data 280 respectively, each being registered into the screen/procedure registration library 130.

As shown in FIG. 3, the normal processing screen/procedure data 210 manages screen specifying data 220, output variable data 230 and input variable data 240 for each service ID 211 and for each sequence number (SEQ) 213 of screens to be outputted.

The screen specifying data 220 has information for specifying a screen. In case of matching a combination of a screen position 221 or a special condition 225, screen data is determined to match the screen specifying data 220.

Such a combination of the screen position 221 and the comparison content 223 may be compared with screen specifying information such as a character string (e.g., a screen number or a characteristic message), a bit-map image, a cursor position, a plane number, an attribute, a size, a shift character (SO/SI), a pixel value, a format color table, etc. These techniques are known in the art, as disclosed in "VisualAge Test for OS/2, User's Guide for Autotest Performer, Version 1.0", March 1996, IBM Corp. (Form No. SC88-3149-00), pp. 82 to 85.

While in the preferred embodiment of this invention, plural combinations of the screen position 221 and the comparison content 223 may be defined, a default combination is selected to be an AND condition. The special condition 225 may be defined in the form of:

"$A=(G1+G2)*G3$" or "$A=G1*(G2-G3)$" or "$A=(G1\ 4c+y2c)$".

Here, "A" denotes the screen data holding means 103, whereas "G1 to G3" denote sets of the registered screen position 221 and the comparison content 223. Symbol "+" denotes an OR condition, whereas symbol "*" denotes an AND condition. Also, symbol "−" denotes an out-of-comparison area. The term "4c" determines whether or not a character string of the comparison content 223 appears in 4 characters from the screen position 221 in a row direction, whereas the term "+y2c" determines whether or not a character string of the comparison content 223 appears up to 2 characters in a column direction.

The output variable data 230 has information for specifying output data to be sent to the client machine 150. Screen position/length 231 is registered in combination with a variable identifier 233, and used for sending data appearing in this position to the client machine 150 as having the variable identifier 233 so set up.

A conversion logic 235 is a logic for converting a variable value. By way of example, registering "1=Male, 2=Female" into this logic 235, it is possible to send a variable value after converting it to information readily understandable to a user such that a converted variable value "1" denotes a male and "0" denotes a female.

The special logic 237 may comprise a complex conversion logic. In so doing, it is possible to calculate a sum or an average value of a plurality of numerical values included in screen data and to send it to the client machine 150.

The input variable data 240 has information for specifying a procedure used for changing to a next screen. A screen position 241, a variable identifier 243 and an input value 245 are registered in combination with each other. After registration thereof, the input value 245 is entered into the registered screen position 241. Input variable data registered at this stage functions as a default value, and if an automatic execution command message 340 has information of the input value 245 or the screen position 241 related to this variable identifier 243, a value inputted from this message 340 is preferentially executed.

An event type 247 has information for specifying a type of an event (e.g., an execution/transmission key, a PF key or the like) to be sent to the host application 141.

FIG. 4 is a conceptual diagram showing the exceptional processing screen/procedure data 250. Like the normal processing screen/procedure data 210 of FIG. 3, this data 250 manages information of screen specifying data 260 and input variable data 270 for each service ID 251 and for each sequence number (SEQ) 253 of screens to be outputted.

Registration content of its screen specifying data 260 is the same as that of the normal processing screen/procedure data 210. While substantially the same items as those of the input variable data 240 of FIG. 3 are registered in the input variable data 270, this exceptional processing screen/procedure data 250, additionally manages information of a continuous processing flag 279, which is used in a case where sending of an event several times is required to recover from an exceptional screen to a normal processing screen.

FIG. 5 is a conceptual diagram showing the special processing procedure data 280. Similarly to the exceptional processing screen/procedure data 250 of FIG. 4, this data 280 manages information of input variable data 290 for each service ID 281 and for each sequence number (SEQ) 283 of screens to be outputted. Registration content of its input variable data 290 is the same as that of the exceptional processing screen/procedure data 250.

These normal processing screen/procedure data 210, exceptional processing screen/procedure data 250, and special processing procedure data 280 mat be manually modified by a text editor or the like.

C-3. Registration Operation

Figure 6:
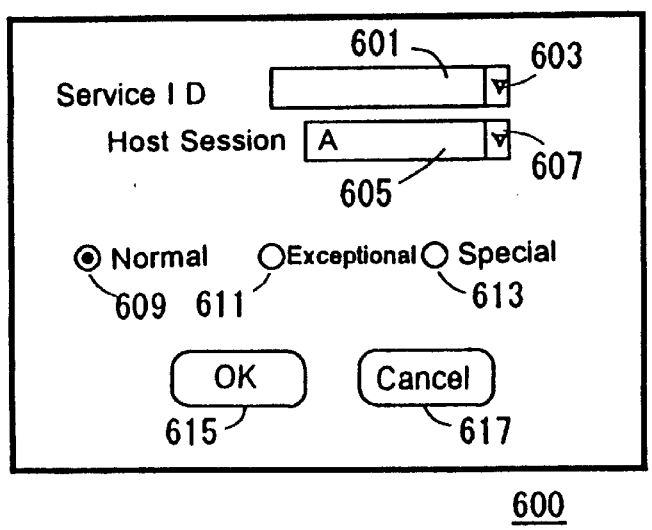
FIG. 6 is a diagram showing a user interface at registration time in a preferred embodiment of this invention.

FIG. 6 shows a service ID's setup window 600 displayed at the starting time of the definition means 110. In this window 600, there exists an entry 601 that is used by a user for inputting a service ID. Already registered service IDs may be selected by a drop-down button 603.

In an environment where a plurality of terminal emulators 101 exist on the server machine 101 that is subject to registration, a host session 605 specifies which of the terminal emulators 101 is to be used for carrying out registration. Such designation in the host session 605 may be selectively made by a drop-down button 607 using a mouse operation alone.

Also, by means of radio buttons 609 to 613, it is possible to select one of aforesaid normal processing screen/procedure data 210, exceptional processing screen/procedure data 250, and special processing procedure data 280 to be registered.

Then, clicking an OK button 615, an event for passing the control to the designated terminal emulator 101 is sent first. In so doing, a window of this terminal emulator 101 becomes displayed on the foreground even if this window is in a non-display condition or it is hidden by another screen.

Then, as shown in FIG. 7, the definition means 110 displays a normal processing screen/procedure data's registration window 800 together with a terminal emulator's screen 700, and passes the control to this window 800. This window 800 is divided into a screen specifying area 810, an output variable specifying area 830 and an input variable specifying area 850.

In the screen specifying area 810, there are provided entries for inputting contents of a screen identifier 801, a screen position 803, a character content 805 and a special condition 815. The screen identifier 801 is provided for enabling understanding of registration content when an operator carries out a registration work or modifies a registered content. The screen position 803 indicates a starting position of a character string or the like that specifies a screen. The character content 805 indicates an actual content such as characters for specifying a screen. The special condition 815 is a setup condition inputting area for specifying a screen using a special condition.

First, when an operator is to specify a screen number "A00" (701) existing on the right upper part of the screen, he/she clicks the position of "A" with a mouse button, or manipulates cursor keys on a keyboard for moving a cursor to the position of the first character "A" in the screen number 701.

Next, after specifying "A00" on the terminal emulator's screen 700 by drag-and-release of a mouse, the screen number "A00" is copied into a chipboard using a known technique. Then, it is pasted in a portion of a character content entry 805. Instead of such paste, a keyboard may be used for inputting a character content. Then, depressing an OK button 809, the definition control means 111 (FIG. 2) inquires of the terminal emulator 101 via the procedure execution means 117 about the current cursor position, displays its information on the screen position entry 803, and writes it as the screen position 221 of the screen specifying data 220 (FIG. 3). Also, the content inputted into the character content entry 805 is written as the comparison content 223 (FIG. 3).

In case of processing not only the screen number "A00" on the terminal emulator's screen 700 but also "Mail Waiting" 705 that is displayed on the right lower part for indicating existence of an unread (unfinished) mail, it must be registered in addition to registration of said screen number.

In such a case, an operator clicks a "Next Content" button 813. In so doing, the presently inputted content is cleared for the purpose of registering the next screen position 803 and character content 805. Similarly to the above described procedure for registering a screen number, specifying the screen position 803 and the character content 805, then depressing the OK button 809, it is possible to register a second set of the screen position 221 and the comparison content 223 (FIG. 3).

On the other hand, in case of processing not only the screen number "A00" on the terminal emulator's screen 700 but also such a service that allows automatic execution from 8:00 to 20:00 every day, these conditions may be set up by moving a cursor to the head of a portion 703 that represents the time of day, inputting "%H" (% is a reserved word) into the character content entry 805, inputting "if 7<%H<20" into a special condition entry 815 and clicking OK buttons 809, 817. In this special condition entry 815, it is possible to input a reserved word indicating a forced completion, a reserved word indicating a branch (along with an ID of a service as a branch target) or the like.

Next, a procedure for designating an output variable will be described. In case of outputting the Julian date 707 of today, for example, a cursor on the terminal emulator's screen 700 is moved to the head portion "2" of its output value, "3" is inputted into a length entry 822, "Jdate" is inputted into a variable identifier 823, and an OK button 829 is depressed. In so doing, similarly to specifying a screen, information such as screen position and the like is written into each item of the normal processing screen/procedure data 210.

A conversion logic entry 825 is registered in a case where conversion of an output value is required. For example, registering "1=Male, 2=Female" into the conversion logic 235, variable values "1" and "2" are converted to "Male" and "Female" respectively. In the special logic 237, a complex conversion logic may be set up. In so doing, it is possible to calculate a sum or an average value of a plurality of numerical values included in screen data as well.

In case of specifying an input variable, it may be specified in the same manner as specifying a screen. That is, a cursor on the terminal emulator's screen 700 is moved to the head of positions where an input value is to be inputted, information is set to a variable identifier entry 843 and an input value entry 845 of the normal processing screen/procedure data's registration window 800 using a keyboard or the like, and then an OK button 849 is depressed.

In so doing, the definition control means 111 (FIG. 2) inquires of the terminal emulator 101 via the procedure execution means 117 about the current cursor position, displays its information on the screen position entry 803, and writes it as a content of the screen position 241 of the input variable data 240 (FIG. 3). Also, the contents inputted into the variable identifier entry 843 and the input value entry 845 are written as contents of the variable identifier 243 and the input value 245 (FIG. 3) respectively.

In a case where it is necessary to define a plurality of input values, "Next Content" button 853 is clicked and it is registered in the same manner as described above.

And, if a specific event (e.g, PF key, execution/transmission key, ESC key, or the like) occurs when the normal processing screen/procedure data's registration window 800 is in an active state, a content of this event is written into the event type 247 (FIG. 3). On the other hand, the definition control means 111 generates an event to be sent to the host machine 140 based on information of the screen position 241 of the input variable data 240, the input value 245 and the detected event, thereby to send it toward the host machine 140 via the procedure execution means 117 and the terminal emulator 101.

Alternatively, selecting an event type in a drop-down manner and depressing an execution button 855, it is also possible to carry out a write into the event type 247 of the normal processing screen/procedure data 210 and to generate an event to be sent to the host machine 140.

The procedure execution means 117 may cause a panel to be generated for prompting an operator to finally confirm sending of this event prior to its sending to the host machine 140, thereby enabling the operator to indicated execution of its sending or cancellation.

After sending this event to the host machine 140, SEQ 213 of the normal processing screen/procedure data 210 is incremented, so that the next screen specifying data 220, output variable data 230 and input variable data 240 will be registered.

Note in this respect that a registered content may be changed by depressing "Registration of Previous Screen" button 871 or "Registration of Next Screen" button 873 and by causing a screen of a desired SEQ to be displayed. In response thereto, an operator may carry out an operation on the terminal emulator's screen 700 to set up it to a desired screen. Also, using an insert button 875 or a delete button 877, a registered content may be inserted or deleted. With this operation, SEQ 213 of the succeeding registration data and a final value of SEQ 213 are updated.

At the end of inputting, an operator depresses "End of Registration" button 879, thereby to complete registration of the normal processing screen/procedure data 210. In this case, a final value of SEQ 213 is saved in relation to the service ID 211. When registration of this data 210 is completed, a panel is then displayed for inquiring of an operator about whether or not the exceptional processing screen/procedure data 250 is to be registered next. If "Yes" is selected in this panel, an exceptional processing screen/procedure data's registration window 900 shown in FIG. 9 is opened.

While this window 900 is similar to the window 800 shown in FIG. 7, it differs from the latter in that there is no output variable specifying area 830 and, in the input variable specifying area 850, continuous inputting may be specified at 857.

After registering the exceptional processing screen/procedure data 250 in the same manner as normal processing and completing its registration, a panel is displayed for inputting of an operator about whether or not the next exceptional processing screen/procedure data 250 is to be registered. If "Yes" is selected in this panel, it is possible to register the next exceptional processing screen/procedure data 250.

Conversely, if "No" is selected, then a panel is displayed for inquiring of an operator about whether or not the special processing procedure data 280 is to be registered. If "Yes" is selected in this panel, a special processing procedure data's registration window 950 shown in FIG. 9 is opened.

This window 950 corresponds to the input variable specifying area 850 and thereunder of the window 800 shown in FIG. 7. Similarly to the window 900 shown in FIG. 8, it is possible to specify continuous input 857 in the input variable specifying area 850.

After carrying out registration in this special processing procedure data's registration window 950 in the same manner as normal processing and completing its registration, a panel is displayed for inquiring of an operator about whether or not the next special processing procedure data 280 is to be registered. If "Yes" is selected in this panel, it is possible to register the next special processing procedure data 280. Conversely, if "No" is selected, then the registration work is completed.

D. Execution

Figure 10:
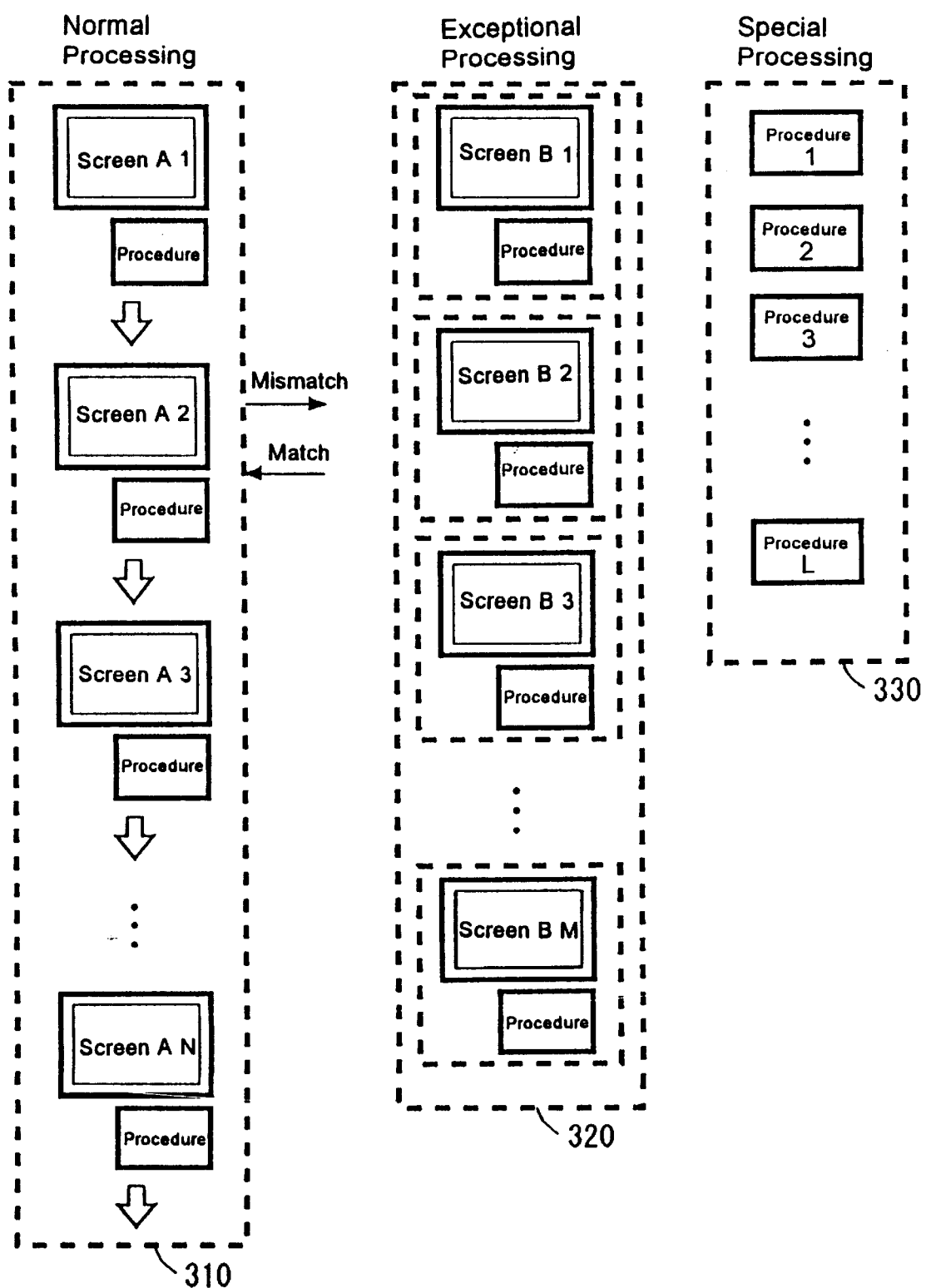
FIG. 10 is a conceptual diagram showing a summary of an execution procedure in a preferred embodiment of this invention.

Next, execution of the procedure in the preferred embodiment of this invention will be described. FIG. 10 is a conceptual diagram showing execution procedures of this invention.

D-1. Summary of Execution

As shown in the left side flow of this drawing, if no exceptional screen appears, and screens "A1" to "AN" registered as normal processing successively appear, input variable data registered as normal processing is sequentially sent toward the host machine 140 to obtain output values.

On the other hand, if an exceptional screen appears, it is determined whether or not this screen matches either one of the exceptional processing screen groups "B1" to "BM". If there is a match, a processing procedure associated with this matched exceptional screen "Bi" is automatically executed and it is determined whether or not it matches a normal screen "Ai" (1<i<N) that would have appeared if there did not occur no match. If there is a match, the procedure is returned there. Otherwise, processing procedures of the special processing are sequentially executed to determine whether or not it matches a normal screen "Ai" (1<i<N). If there is a match, the procedure is returned there.

As described, it is determined whether or not this is one of the predetermined exceptional screens, and if so, an input variable associated with this exceptional screen is sent to the host machine 140. By means of this input variable, it becomes possible to carry out recovering from an exceptional screen to a normal processing screen, interruption of processing, and execution of exceptional processing groups.

D-2. Sending of Automatic Execution Command Message

The client application 151 sends an execution instruction (automatic execution command message 340), which includes a command ID for indicating that this is an automatic execution command message, a service ID, an input variable's value, an output variable's value, a password and the like, toward the server machine 100 via a communication interface 153.

Figure 11:
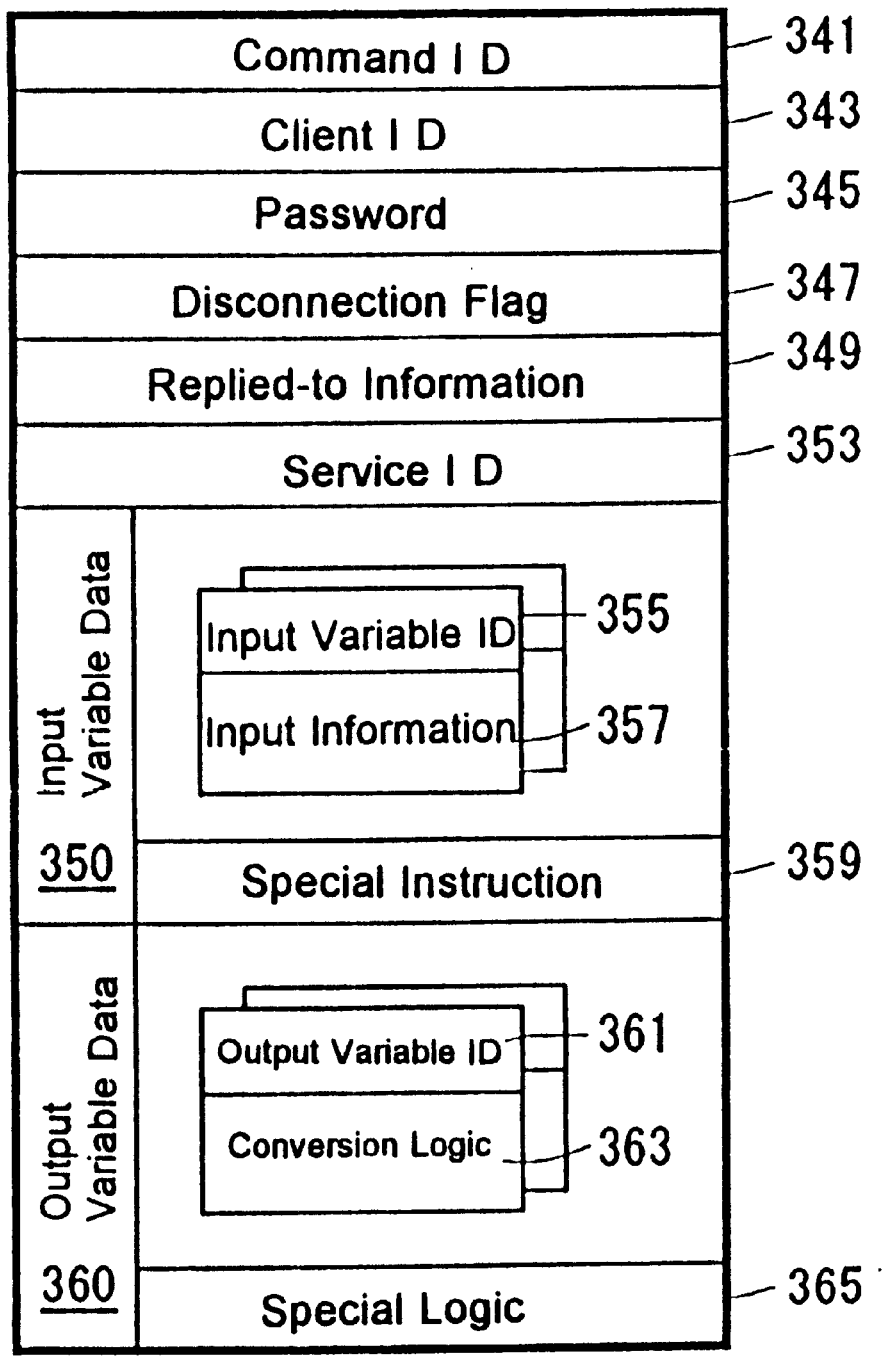
FIG. 11 is a conceptual diagram of an automatic execution command message in a preferred embodiment of this invention.

FIG. 11 is a conceptual diagram of the automatic execution command message 340. A command ID 341 included in this message 340 has information for identifying that this is an automatic execution command message.

A client ID 343 and a password 345 have information for confirming authorization of accessing the server machine 100. A disconnection flag 347 is a flag for disconnecting a communication without waiting for arrival of a reply message after sending the automatic execution command message 340, whereas replied-to information 349 has information for specifying a destination of a reply message. When the client machine 150 is in a mobile environment, it may temporarily disconnect a communication with the server machine 100 after sending the automatic execution command message 340 to save communication costs or the like, and subsequent to completion of the automatic execution processing of the host application 141, it may cause the server machine 100 to send a reply message to a destination designated by this replied-to information 349.

While this replied-to information 349 has information such as a telephone number or an IP address used for accessing the client machine 150 that sends the automatic execution command message 340, it may have information used for accessing another machine. If a reply message is not successfully sent to the client machine 150, a predetermined number of retries are executed, and if it is not successful again, the reply message is sent to a server where a mail box of the user exists.

The service ID 353 has information for specifying a service to be automatically executed, whereas input variable data 350 has information for controlling an input value or condition on the client side at the time of automatic execution. Also, output variable data 360 defines an output value to be outputted at the time of automatic execution, or it has information for controlling a conversion or editing on the client side.

D-3. Automatic Execution

The execution control means 127 of the server machine 100 receives this automatic execution command message 340 via the communication interface 129, interprets this message 340, and indicates the screen comparison/determination means 123 to start automatic execution. This message 340 is temporarily stored into the input data holding means 131.

This message 340 is sent from the client machine 150 in a coded/compressed form, whereas the execution control means 127 is capable of decoding/decompressing it. After such decoding/decompression, the execution control means 127 carries out authentication processing through checking of a registration list (not shown) based on the client ID 343 and the password 345. If it is determined that there is no registration as a result of this checking, a message indicating an access denial is sent toward the client machine 150.

On the other hand, if it is determined that the user is registered, the execution control means 127 generates a new thread for this automatic execution command message 340, and causes the procedure execution means 121, the screen comparison/determination means 123 and the output data generating means 125 to be operated. Note that if a certain number of threads are already generated, this message 340 is temporarily stored into an FIFO queue to wait for its execution until another processing is completed. When the FIFO queue is in a full condition, a message is sent for indicating that this message 340 should be sent toward the client machine 150 for sometime later.

Note that the execution control means 127 has functions for identifying a protocol of the automatic execution command message 340, converting it to a common format, and storing it into the input data holding means 131 in the common format so converted.

Figure 12:
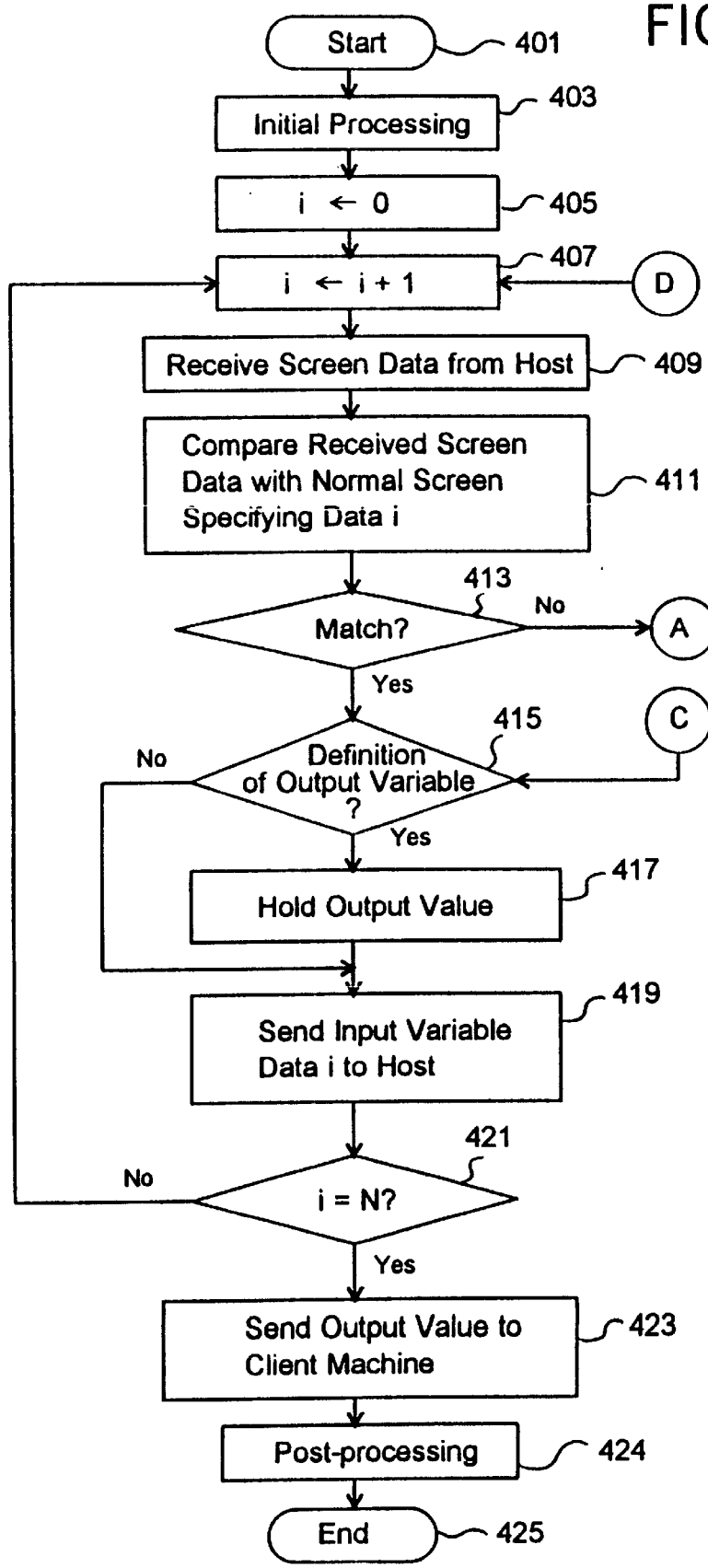
FIG. 12 is a flow chart showing a processing procedure of normal processing in a preferred embodiment of this invention.

FIG. 12 is a flow chart showing a processing procedure of automatic execution in the preferred embodiment of this invention. This processing starts when the execution control means 127 receives the auto matic execution command message 340 from the client application 151 and provides an indication of execution to the screen comparison/determination means 123 (block 401). When this processing is started, initial processing including initialization of a variety of parameters, confirmation of an operation of the terminal emulator 101 or the like is executed (blocks 403, 405).

Next, from the command ID 341 and the service ID 343, it is determined that this is a service of carrying out automatic execution processing for the host application 141, and then screen data held in the terminal emulator 101 is received (block 409).

In the preferred embodiment of this invention, the terminal emulator 101 is installed on the same number of server machines 100 as that of the client machines 150 concurrently supportable by the server machine, and it is set up such that it operates in synchronization with starting of the server machine 100. For this reason, the terminal emulator 101 holds an initial screen associated with its supporting client machine 150 in its initial condition.

Figure 13:
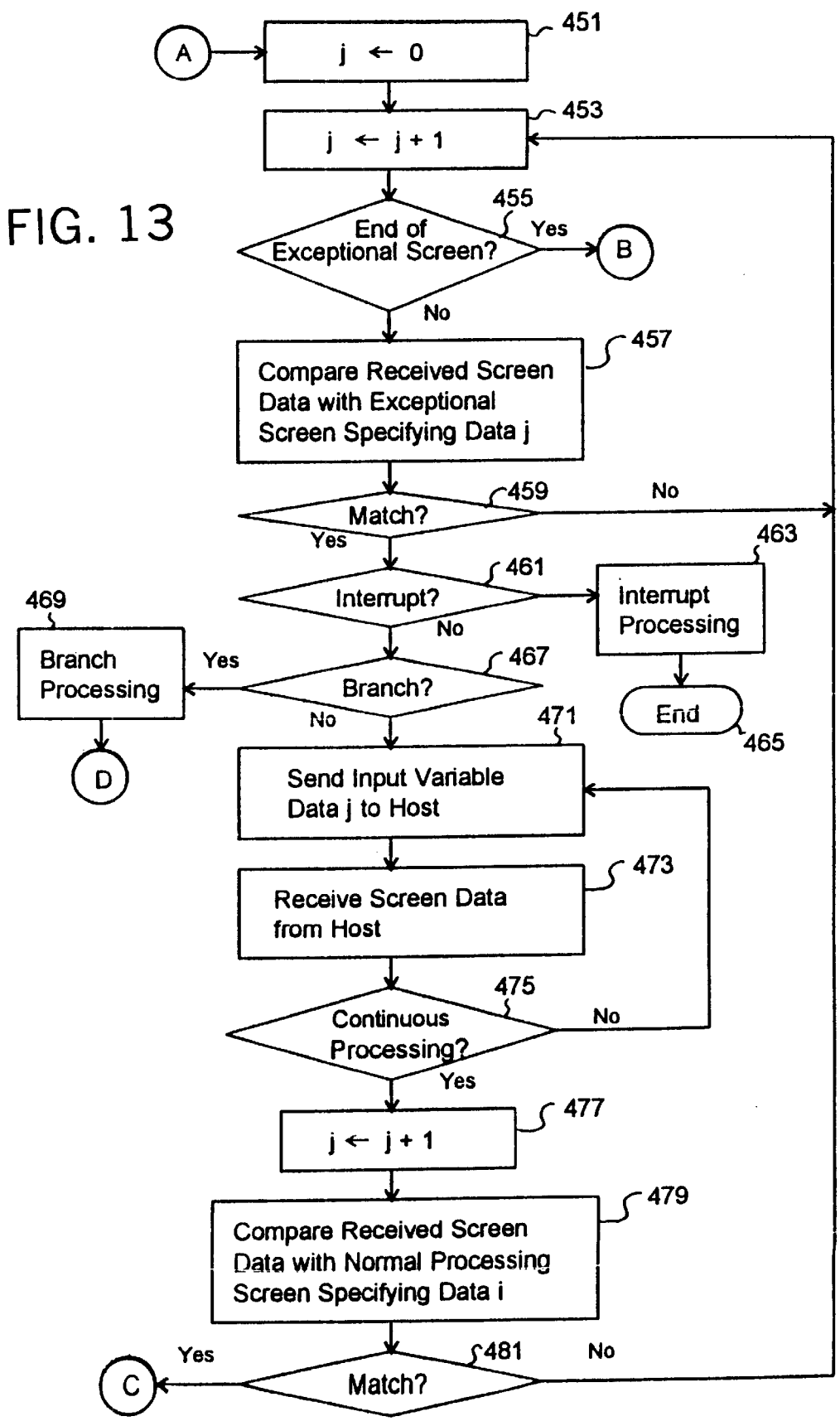
FIG. 13 is a flow chart showing a processing procedure of exceptional processing in a preferred embodiment of this invention.

Then, using a value of the service ID 353 received from the client machine 150 and a value of "i", normal screen specifying data "i" is extracted from the screen/procedure registration library 130, and this is compared with the screen data received from the terminal emulator 101 (blocks 411, 413). If they do not match, a exception screen processing routine (A) of FIG. 13 is executed.

If they match, it is further determined whether or not there exists a definition of an output variable (block 415). If so, an output value is held in the output data holding means 132 (block 417). If not, the processing proceeds to the next step (block 419), without holding any output value.

Next, an input variable "i" is sent toward the host machine 140 via the terminal emulator 101. At this time, the screen comparison/determination means 123 checks whether or not there exists designation of the input variable "i" in the input data holding means 131. If so, this input variable's value and the like are converted in accordance with such specification and the converted results are sent toward the host machine 140 (block 419).

Then, it is determined whether or not "i" is equal to "N", i.e., if this is the last one of registered data (block 421). If so, it is determined that the processing is to be completed and, then, an output value held in the output data holding means 132 is sent to the client machine 150 (block 423). If not, "i" is incremented (block 407), and the comparison processing of the next processing screen is repeated.

FIG. 13 is a flow chart showing an exceptional screen processing routine in the preferred embodiment of this invention. This routine is executed when, at block 413 of FIG. 12, the normal screen specifying data "i" does not match screen data received form the terminal emulator 101.

Figure 14:
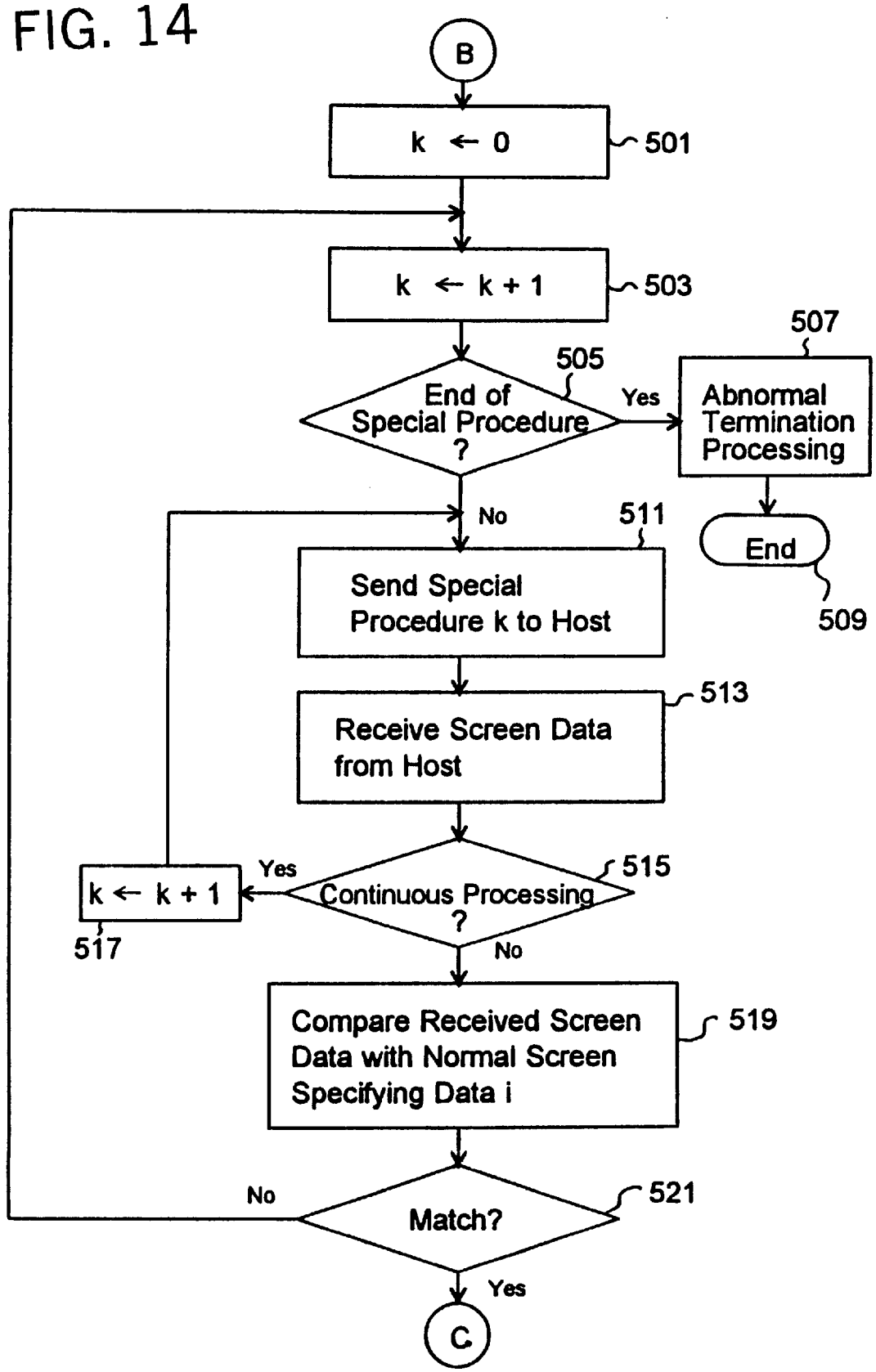
FIG. 14 is a flow chart showing a processing procedure of special processing in a preferred embodiment of this invention.

In this routine, initialization of "j" is executed at the outset (block 451). Then, it is determined whether or not there exists the screen specifying data 260 of this exceptional processing screen/procedure data "j" (block 455). If not, it means that no exceptional processing screen/procedure data is set up any longer and, thus, a special processing routine of FIG. 14 is executed.

If so, it is further determined whether or not the screen data held in the screen data holding means 103 matches a definition of the screen specifying data 260 of this exceptional processing screen/procedure data "j" (blocks 457, 459).

If not, the screen specifying data 260 of the next exceptional processing screen/procedure data "j+1" (block 453) is processed.

And, if the screen data held in the terminal emulator 101 matches definition of the screen specifying data 260 of this exceptional processing screen/procedure data "j" (blocks 457, 459), it is determined whether or not there is involved an instruction indicating an interruption (block 461). More specifically, it is determined whether or not a reserved word indicating an interruption (e.g., "int") is defined in the variable identifier 273 of the input variable data 270.

If so, interruption processing is executed (block 463), and the processing is completed. In the preferred embodiment of this invention, as interruption processing, a group of commands for disconnecting a connection with the host machine 140 are sequentially sent to the host machine 140, whereas a message indicating that the processing has been interrupted, as well as another message indicating a cause of the interruption and specifying a screen where the interruption occurs are sent to the client machine 150, thereby to perform post processing such as deletion of a thread or the like.

If there is no instruction indicating an interruption, it is further determined whether or not there is involved an instruction indicating a branch (block 467). More specifically, it is determined whether or not a reserved word indicating a branch (e.g., "div") is defined in the variable identifier 273 of the input variable data 270.

If there is involved an instruction indicating a branch, branch processing is executed (block 469). In the preferred embodiment of this invention, a service ID 211 and a screen number "i" (default is 0) are defined in the variable identifier 273 of the input variable data 270, whereby the processing procedure of FIG. 12 is executed by changing values of the service ID 211 and "i".

If there is no instruction indicating a branch, the input variable data "j" is sent toward the host machine 140 (block 471), and screen data is received from the host machine 140 (block 473).

And, it is determined whether or not the continuous processing flag 279 is set to ON (block 475), and if so, the next input variable data "j+1" is sent toward the host machine 140 (blocks 477, 471).

If the continuous processing flag 279 is not set to ON, it is determined whether or not the received screen data matches the normal screen specifying data "i" (blocks 479, 481). That is, it is determined whether or not the screen is recovered by means of sending input variable data of the exceptional processing screen/procedure data 250.

If it is determined that the screen is recovered, process returns to block 415 of FIG. 12, whereas if it is determined that the screen is not recovered, screen specifying data of the next exceptional processing screen/procedure data "j+1" is processed.

FIG. 14 is a flow chart showing a special processing routine in the preferred embodiment of this invention. This routine is executed when, at block 455 of FIG. 13, it is determined that there is no matching exceptional screen.

In this special processing routine, initialization of "k" is executed at the outset (block 503). Then, it is determined whether or not there exists input variable data of the special procedure data "k" (block 505). If there is no input variable data of the special procedure data "k", it is determined that there is no way to recover any longer and, thus, abnormal completion processing is executed (block 507) and the processing is completed (block 509).

If there is input variable data of the special procedure "k", the input variable data is sent to the host machine 140 (block 511) and screen data is received from the host machine 140 (block 513).

It is further determined whether or not the continuous processing flag 299 is set to ON (block 515), and if so, the next input variable data "k+1" is sent toward the host machine 140 (blocks 517, 511).

If the continuous processing flag 299 is not set to ON, it is determined whether or not the received screen data matches the normal screen specifying data "i" (blocks 519, 521). That is, it is determined whether or not the screen is recovered by means of sending input variable data of this special processing procedure data 280.

If it is determined that the screen is recovered, process returns to block 415 of FIG. 12, whereas if it is determined that the screen is not recovered, an input variable "k+1" of the next special processing procedure data 280 is processed.

E. Miscellaneous

While this invention has been described above in the form of an implementation using message packets, this invention may be practiced whenever the server machine 100 obtains an execution instruction. Accordingly, providing a known voice recognition function or a voice synthesizing function on the server machine 100, this invention may be practiced by means of a telephone rather than an electronic mail. In such a case, it is sufficient to add modifications to the execution control means 127 alone.

That is, the execution control means 127 may be provided with a function for analyzing a voice signal inputted via a telephone line and converting it to an automatic execution command message, as well as another function for synthesizing a processed result to a voice signal and sending it back to a terminal.

Similarly, providing a known character recognition function or a FAX transmission on the server machine 100, this invention may be practiced by means of a FAX signal rather than a message packet. In such a case, it is sufficient to add modifications to the execution control means 127 alone.

That is, the execution control means 127 may be provided with a function for analyzing a FAX signal inputted via a telephone line and converting it to an automatic execution command message 340 through character recognition, as well as another function for converting a processed result to a FAX signal and sending it back to a terminal.

Further, providing a function for converting a push-phone signal rather than a mail processing function on the server machine 100, this invention may be practiced by means of a telephone rather than a message packet. In such a case, it is sufficient to add modifications to the execution control means 127 alone.

That is, the execution control means 127 may be provided with a function for analyzing a push-phone signal inputted by a user in accordance with voice guidance and converting it to an automatic execution command message 340 with reference to a previously registered table, as well as another function for converting a processed result to a voice signal.

Advantages of the Invention

As described above, in accordance with this invention, it is possible to provide an automatic execution system that is capable of handling an exceptional operation without changing or adapting an application program to be automatically executed.

In accordance with one aspect of this invention, it is possible to record an operational procedure without developing an automatic execution program for each application program to be automatically executed, thereby enabling the set up of automatic execution of an application without requiring high level knowledge of programming.

In accordance with another aspect of this invention, it is possible to record an operational procedure without developing an automatic execution program for each application program to be automatically executed, thereby facilitating to set up automatic execution of an application.

In accordance with another aspect of this invention, it is possible to provide an automatic execution system that is capable of dynamically changing an execution procedure in accordance with the nature of an application.

In accordance with another aspect of this invention, it is possible to provide an automatic execution system that is capable of dynamically changing an application to be execute in accordance with a user's request.

In accordance with another aspect of this invention, it is possible to provide an automatic execution system that is capable of automatically recovering fixed types of errors.

In accordance with another aspect of this invention, it is possible to provide an automatic execution system that is capable of reducing a gross amount of transactions occurring in a system.

In accordance with another aspect of this invention, it is possible to provide an automatic execution system that is capable of automatically executing an application even where a client machine is provided with a small storage capacity.

In accordance with another aspect of this invention, it is possible to provide an automatic execution system that reduces inputs required at a client machine.

In accordance with another aspect of this invention, it is possible to provide an automatic execution system that reduces an amount of communication data to be communicated between a client machine and a server machine.

In accordance with another aspect of this invention, it is possible to provide an automatic execution system that is capable of rapidly providing a processed result to a user.

In accordance with another aspect of this invention, it is possible to provide a system that is capable of automatically execution an application without depending a platform of a client machine.

We claim:

1. An information processing adaption apparatus to provide automatic execution of an application program on a host machine without modifying the application program which adaption apparatus is communicably connected to both a client machine for accessing a screen and a procedure library that stores a plurality of ordered normal processing screen specifying data items, and a plurality of normal processing input event specifying data items being respectively associated with said plurality of normal processing screen specifying data items, the adaption apparatus being adapted for sending an event specified by one of said normal processing input event specifying data items to the unmodified application program on the host machine for causing the same to generate a screen data item associated with the said event, extracting from said screen data item an output variable specified by one of normal processing output variable specifying data items that are respectively associated with said plurality of normal processing screen specifying data items, and sending the extracted output variable to said client machine, said adaption apparatus comprising:

(a) screen comparison and determination means for determining whether or not a screen data item, which is generated as a result of sending an event specified by an "i"th ("i" is a natural number) normal processing input event specifying data item to said application, matches an "i+1"th normal processing screen specifying data item, and if said screen data item matches said "i+1"th normal processing screen specifying data item, then extracting from said screen data item an output variable specified by one of said normal processing output variable specifying data items that is associated with said "i+1"th normal processing screen specifying data item; and (b) output generating means for sending the said extracted output variable to said machine.

2. An information processing containing adaption apparatus for providing automatic execution of exceptional operation to an application program without modification of the program, said processing system, comprising:

(a) a screen procedure library for storing a plurality of ordered normal processing screen specifying data items, a plurality of normal processing screen specifying data item groups each being specified by one of normal processing screen specifying data item group's specifying data items, a plurality of normal processing input event specifying data items being respectively associated with said plurality of normal processing screen specifying data items, an exceptional processing screen specifying data item, and an exceptional processing input event specifying data item being associated with said exceptional processing screen specifying data item;

(b) a client machine for sending one of said normal processing screen specifying data item group's specifying data items;

(c) a server machine coupled to the screen procedure library and the client machine for receiving said normal processing screen specifying data item group's specifying data item, and sending an event specified by an "i"th ("i" is a natural number) normal processing input event specifying data item that belongs to one of said plurality of normal processing screen specifying data item groups that is specified by the said received normal processing screen specifying data item group's specifying data item; and (d) a host machine containing the application program and coupled to the server machine for having the unmodified application program send a screen data item to the server machine upon receipt of the specified event;

(e) wherein said server machine is further arranged to perform the following operations:

(e1) determining whether or not said screen data item matches an "i+1"th normal processing screen specifying data item that belongs to the said specified normal processing screen specifying data item group;

(e2) if said screen data item matches said "i+1"th normal processing screen specifying data item that belongs to said specified normal processing screen specifying data item group, then extracting from said screen data item an output variable specified by an associated normal processing output variable specifying data item, and sending the said extracted output variable to said client machine;

(e3) if said screen data item does not match said "i+1"th normal processing screen specifying data item that belongs to said specified normal processing screen specifying data item group, then determining whether or not said screen data item matches said exceptional processing screen specifying data item; and (e4) if said screen data item matches said exceptional processing screen specifying data item, then sending an event specified by said exceptional processing input event specifying data item to said application program.

3. A computer program on a computer usable medium for storing a program readable and executed by an information apparatus machine to implement an information processing method for providing automatic execution of an exceptional operation to an application program without modification of the application program, the information processing method being based on a plurality of normal processing screen specifying data items that are stored in an ordered sequence, and a plurality of normal processing input event specifying data items that are respectively associated with said plurality of normal processing screen specifying data items, the method being adapted for sending an event specified by one of said normal processing input event specifying data items to an application for causing the event specifying data items to generate a screen data item associated with the said event, extracting from said screen data item an output variable specified by one of normal processing output variable specifying data items that are respectively associated with said plurality of normal processing screen specifying data items, and sending the extracted output variable to said machine, said program comprising:

(a) first program code for indicating said information processing apparatus to send an event specified by an "i"th ("i" is a natural number) normal processing input event specifying data item to said application, thereby causing the same to generate a screen data item;

(b) second program code for indicating said information processing apparatus to determine whether or not said screen data item matches an "i+1"th normal processing screen specifying data item;

(c) third program code, being responsive to a determination that said screen data item matches said "i+1"th normal processing screen specifying data item, for indicating said information processing apparatus to extract from said screen data item an output variable specified by one of said normal processing output variable specifying data items that is associated with said "i+1"th normal processing screen specifying data item;

(d) fourth program code for indicating said information processing apparatus send the said extracted output variable to a machine running the application program;

(e) fifth program code, being responsive to a determination that said screen data item does not match said "i+1"th normal processing screen specifying data item, for indicating said information processing machine to determine whether or not said screen data item matches said exceptional processing screen specifying data item; and (f) sixth program code, being responsive to a determination that said screen data item matches said exceptional processing screen specifying data item, for indicating said information processing machine to send an event specified by said exceptional processing input event specifying data item to said application.

4. An information processing method for enabling automatic execution of an exceptional operation for a computer application program without modifying the program for such execution, comprising the steps of:

(a) storing separately of the computer application program during an operation of the program a sequence of a plurality of ordered normal processing screen specifying data items, a plurality of normal processing screen specifying data item groups each being specified by one of the normal processing screen specifying data item group's specifying data items, a plurality of normal processing input event specifying data items being respectively associated with said plurality of normal processing screen specifying data items, an exceptional processing screen specifying data item and an exceptional processing input event specifying data item being associated with said exceptional processing screen specifying data item;

(b) thereafter on a subsequent operation of the program sending an event specified by an "i"th ("i" is a natural number) normal processing input event specifying data item to said application program for causing the same to generate a screen data item;

(c) determining whether or not said screen data item matches an "i+1"th normal processing screen specifying data item in the separately stored sequence;

(d) if said screen data item matches said "i+1"th normal processing screen specifying data item, then sending an event specified by an "i+1"th normal processing input event specifying data item to said application program;

(e) if said screen data item does not match said "i+1"th normal processing screen specifying data item, then determining whether or not said screen data item matches said stored exceptional processing screen specifying data item; and (f) if said screen data item matches said stored exceptional processing screen specifying data item, then sending an event specified by said exceptional processing input event specifying data item to said application.

5. The method of claim 4 including the steps of:

(g) determining whether or not said second screen data item matches said "i+1"th normal processing screen specifying data item; and (h) if said second screen data item matches said "i+1"th normal processing screen specifying data item, then sending an event specified by said "i+1"th normal processing input event specifying data item to said application.

6. The method of claim 4 wherein said exceptional processing screen is an interruption processing screen specifying data item, and said exceptional processing input event is an interruption processing input event specifying data item that is associated with said interruption processing screen specifying data item.

7. A program for enabling automatic execution of an exceptional operation for a computer application program without modifying the program for such exceptional operation, said program being on a storage medium for use with information processing apparatus communicably connected to a client machine for accessing a screen procedure library that stores, separately of the computer application program, a sequence of a plurality of ordered normal processing screen specifying data items and an exceptional screen specifying data item, and a plurality of normal processing input event specifying data items being respectively associated with said plurality of normal processing screen specifying data items, and an exceptional Processing input event specifying data item being associated with the exceptional screen processing data item the apparatus being adapted for sending an event specified by one of said normal processing input event specifying data items or the exceptional input event specifying data item to an application for causing the same to generate a screen data item associated with the said event, extracting from said screen data item an output variable specified by one of normal processing output variable specifying data items that are respectively associated with said plurality of normal processing screen specifying data items, and sending the extracted output variable to said client machine, said program comprising:

(a) screen comparison software means for determining whether or not a screen data item, which is generated as a result of sending an event specified by an "i"th ("i" is a natural number) normal processing input event specifying data item to said application program, matches an "i+1"th normal processing screen specifying data item in the stored sequence or the exceptional processing screen specifying data item, and if said screen data item matches said "i+1"th normal or the exceptional processing screen specifying data item, then extracting from said screen data item an output variable specified by one of said normal processing output variable specifying data items that is associated with said "i+1"th normal or the exceptional processing screen specifying data item; and (b) output generating software for sending the said extracted output variable to the information programming apparatus.

8. The program on a programming apparatus of claim 7 wherein said information processing apparatus is a host machine.

* * * * *